(12) United States Patent
Hajto et al.

(10) Patent No.: US 7,260,297 B2
(45) Date of Patent: Aug. 21, 2007

(54) DISPLAYS

(75) Inventors: Janos Hajto, Edinburgh (GB); Colin Hindle, Edinburgh (GB); Andrew Graham, Edinburgh (GB)

(73) Assignee: The Court of Napier University, Edinburgh (GB)

( * ) Notice: Subject to any disclaimer, the term of this patent is extended or adjusted under 35 U.S.C. 154(b) by 18 days.

(21) Appl. No.: 11/014,390

(22) Filed: Dec. 16, 2004

(65) Prior Publication Data

US 2005/0111813 A1    May 26, 2005

Related U.S. Application Data

(63) Continuation of application No. 09/744,709, filed as application No. PCT/GB99/02482 on Jul. 29, 1999, now abandoned.

(30) Foreign Application Priority Data

Jul. 29, 1998  (GB) ................................. 9816490.8
Sep. 16, 1998  (GB) ................................. 9820064.5

(51) Int. Cl.
*G02B 6/00*    (2006.01)
(52) U.S. Cl. ...................... 385/115; 385/142; 385/143; 385/144; 385/145; 385/141
(58) Field of Classification Search ........ 385/141–145, 385/115, 116; 428/690; 313/503
See application file for complete search history.

(56) References Cited

U.S. PATENT DOCUMENTS

| 4,195,907 | A | * | 4/1980 | Zamja et al. ................ 385/125 |
| 4,422,719 | A | * | 12/1983 | Orcutt ........................ 385/123 |
| 5,579,429 | A | * | 11/1996 | Naum ......................... 385/143 |
| 5,858,564 | A | * | 1/1999 | Tamura et al. ............... 428/690 |
| 5,956,854 | A | * | 9/1999 | Lorocco ....................... 42/132 |
| 6,078,052 | A | * | 6/2000 | DiFilippo .................... 250/367 |
| 6,124,046 | A | * | 9/2000 | Jin et al. .................... 428/690 |
| 6,259,855 | B1 | * | 7/2001 | Lundin ........................ 385/146 |
| 6,272,269 | B1 | * | 8/2001 | Naum ........................... 385/43 |
| 6,282,355 | B1 | * | 8/2001 | Zarian et al. ................ 385/128 |
| 6,538,375 | B1 | * | 3/2003 | Duggal et al. ............... 313/506 |

* cited by examiner

*Primary Examiner*—Brian Healy
*Assistant Examiner*—Guy G. Anderson
(74) *Attorney, Agent, or Firm*—Drinker, Biddle & Reath LLP

(57) ABSTRACT

The present invention describes a fluorescent dye doped polymer based optical wave-guide structure. The described polymers can be used to fabricate a range of display elements and illumination systems which work without the use of external electrical power. This is due to the process of the fluorescent dyes absorbing ambient light and then subsequently emitting light which is conducted by the polymer host material to a point where it is emitted. The emitted light can be of a range of colours depending upon the type of dye that polymers are doped with. There is a constant contrast between the light power flux emitted for the wave-guide structure and the light power flux of the ambient light. There is also provided a method in which a dielectric stack mirror layer fabricated on the surface of the polymer which can be used to improve the efficiency and the contrast of those optical elements.

9 Claims, 29 Drawing Sheets

Structure of Light Emitting Polymer in the Edge Emitting Mode

Cloudy

**Late Evening
(2 Hours After Sunset)**

Fugure 23

24 Hour Road Signage

24 Hour Traffic Lights

Fixed Advertisement.
Polymer sheet with dielectric stack
mirror coated on the surface 24 Hour Bus Arrival Schedule

DISPLAYS

CROSS-REFERENCE TO RELATED APPLICATION

This application is a continuation of application Ser. No. 09/744,709 filed Jan. 29, 2001 now abandoned.

FIELD OF THE INVENTION

This invention relates to display and illumination technology.

The present invention describes a method in which polymers doped with fluorescent dyes can be used to fabricate display elements and illumination systems for use in applications such as road signs, advertisement displays, toys etc whereby the use of external electrical power is not required. The fluorescent dyes with which these polymers are doped, absorb ambient light, before emitting light which is conducted by the polymer host material to the end of the fibre where the emitted light is of a much greater light power density than the light power density of the ambient light.

SUMMARY OF THE INVENTION

In this field it is already known that flat panel display elements composed out of plastic polymers can be used as display articles and that optical fibres can be used to convey information in telecommunication or in display technology.

Previous application involving such materials had the disadvantage that the sign or display element required illumination through the means of applying an external electrical power supply with this electrical power requiring conversion into light power and consequently this method consumes electrical power. Similarly, in the case of optical fibres, a light source had to be located at one end of the fibre to allow transmission and emission of light at the other end of the fibre.

The optical power density from the fluorescent polymer is higher than the optical power of the ambient light. The ratio between these optical power densities does not depend on the ambient light conditions as long as they are sufficient for excitation of the fluorescent dye.

The suggested new technology does not require any external electrical power because it is extracting light power directly from ambient light (sunlight or artificial light).

The suggested new technology is inherently safer compared to conventional electrical power based technologies it does not use any external or internal voltages and/or currents for its operation.

Another advantage of using the suggested new technology is associated with the fact that it does not require maintenance since it does not use electrical cables.

Further advantages include the technology used in this invention being simple, environmentally friendly, having a one hundred percent recycling capacity and not using the Earth's resources.

Fluorescent dye doped polymers are used to collect ambient light through the introduction of red, green and blue light emitting fluorescent dyes into a polymer host material. The colour of the emitted light can be changed into a required specification through variation of the dyes incorporated into the polymer.

In the case of the polymer taking the form of an optical fibre, through a suitable combination of optical fibre geometry and (length and diameter) and the incorporation of an appropriate fluorescent dye, the light power density at the end of the fibre (light emitter) can be made much larger than the light power density of the ambient light and therefore can be used for illumination or display applications. Furthermore, the contrast between the light power density at the end of the fibre and the light power density of the ambient light remains constant because this parameter only depends on the geometrical and material parameters for a given polymer, but does not depend on the ambient light conditions. The end of the fibres can be used as light emitting pixels in an array. By modulating the light intensity at the end of each fibre selectively, the fibre array can be used as a display device.

The principle of operation is shown in FIG. 1 wherein an optical fibre polymer is shown to be doped with fluorescent dye molecules. Similarly, a transparent polymer film or sheet could also be chemically doped or blended with a fluorescent dye. The fluorescent dye should have a high quantum efficiency for converting natural light or indoor light into some visible colour.

It is an object of this present invention to provide a transparent polymer which can be formed into a film, a sheet, an optical fibre, or similar for use in illumination and display applications.

According to the present invention there is provided an optically transparent polymer, such as an optical fibre, a film or sheet which is doped or blended with organic fluorescent dye molecules for use in visual display wherein fluorescent light is generated when artificial ambient light, daylight or sunlight enters the doped polymer or optical fibres.

Whereas in general any transparent polymer may be used, suitably the transparent polymer is chosen from the group comprising PMMA, polycarbonate and polystyrene.

Whereas in general any organic fluorescent dye can be used, suitably the fluorescent dye molecules are chosen from the group comprising PBD, Bis-MSB, 3-3'-diethyloxycarbocyanine-iodide and cresyl violet 670 perchlorate.

Preferably where the polymer constitutes an optical fibre, the preferred embodiment of the radius of such a fibre is between 0.25 and $0.70 \times 10^{-2}$ meters and the length of the fibre is between 0.2 and 1.6 meters.

Where the preferred embodiment of this invention is an optical fibre, the magnitude of the fluorescent light emitted from such a fibre is given by the equation $Aa/Ae=2L/r$ wherein Aa is the surface area of the fibre and Ae is the area at which the fluorescent light is emitted.

Although a preferred dimension for the radius of an optical fibre embodiment is given, clearly the dimensions of the fibres will depend on their use in proposed displays.

The invention also provides the use of the fibres as display pixels where artificial ambient light or sunlight provides excitation sources.

The invention further provides display devices comprising a plurality of fibres as described herein.

The plurality of fibres may include fibres to emit a variety of colours.

The devices may further comprise shutters to control emission from the individual fibres in a device.

Preferably where there exists a flat panel display or sheet embodiment of this invention, the bottom surfaces and edges of the polymer film are covered with a highly reflective additional layer which acts as a mirror performing the role of total internal reflection of all light entering into the polymer.

Preferably also in such embodiments, the top surface of the polymer shall be covered with a dielectric stack mirror. In a preferred embodiment of this stack it is constituted of an alternating sequence of two dielectric films with alternately high and low refractive indices.

The composition of this dielectric stack is such that the aforementioned stack shall act as an interference filter to allow nearly 100% transmission of light from air into the polymer for wavelengths used for excitation of the dye. Further this aforementioned stack has nearly 100% reflection for light wavelengths emitted from the fluorescent dyes. The dielectric layers can be vacuum evaporated, spin coated or sputtered onto the surface of the polymer.

In an alternative preferred embodiment of this dielectric stack, thin films of two different polymers, with the two different refractive indices, can be applied to the polymer surface sequentially and vacuum pressed and/or thermally treated for each layer. This method has the advantage that it allows larger areas to be covered by the dielectric stack mirror.

Alternatively, cladding can also be used for the same purpose although the efficiency is not as good as with the dielectric stack mirror.

The present invention can be adapted for display purposes as the fluorescent light emitted from the dye can be coupled out from the polymer at the top surface by emitting or removing the dielectric stack mirror at a given surface area and by making an uneven or grated surface at the polymer air interface. The grating structure should be maximised for maximum diffraction for the emitted fluorescent light wavelength.

In an alternative preferred embodiment of this form of the invention, the replacement of the bottom mirror layer of the dielectric stack mirror, identical to the one applied to the top surface allows a combined reflective and transmissive mode of light collection and display operation.

Further an alternative preferred embodiment of the invention provides a further combination of dielectric stack and mirror combinations while using the principles previously described. In this embodiment the dielectric stack mirror is applied on both sides of the transparent polymer-dye matrix but no side mirrors are applied. Consequently the fluorescent light generated inside the polymer will be waveguided towards the edges of the polymer. The invention also provides methods for producing displays as set out herein.

BRIEF DESCRIPTION OF THE DRAWINGS

The invention will now be described with reference to the accompanying figures wherein.

DETAILED DESCRIPTION OF FIGURES

Figure 1:
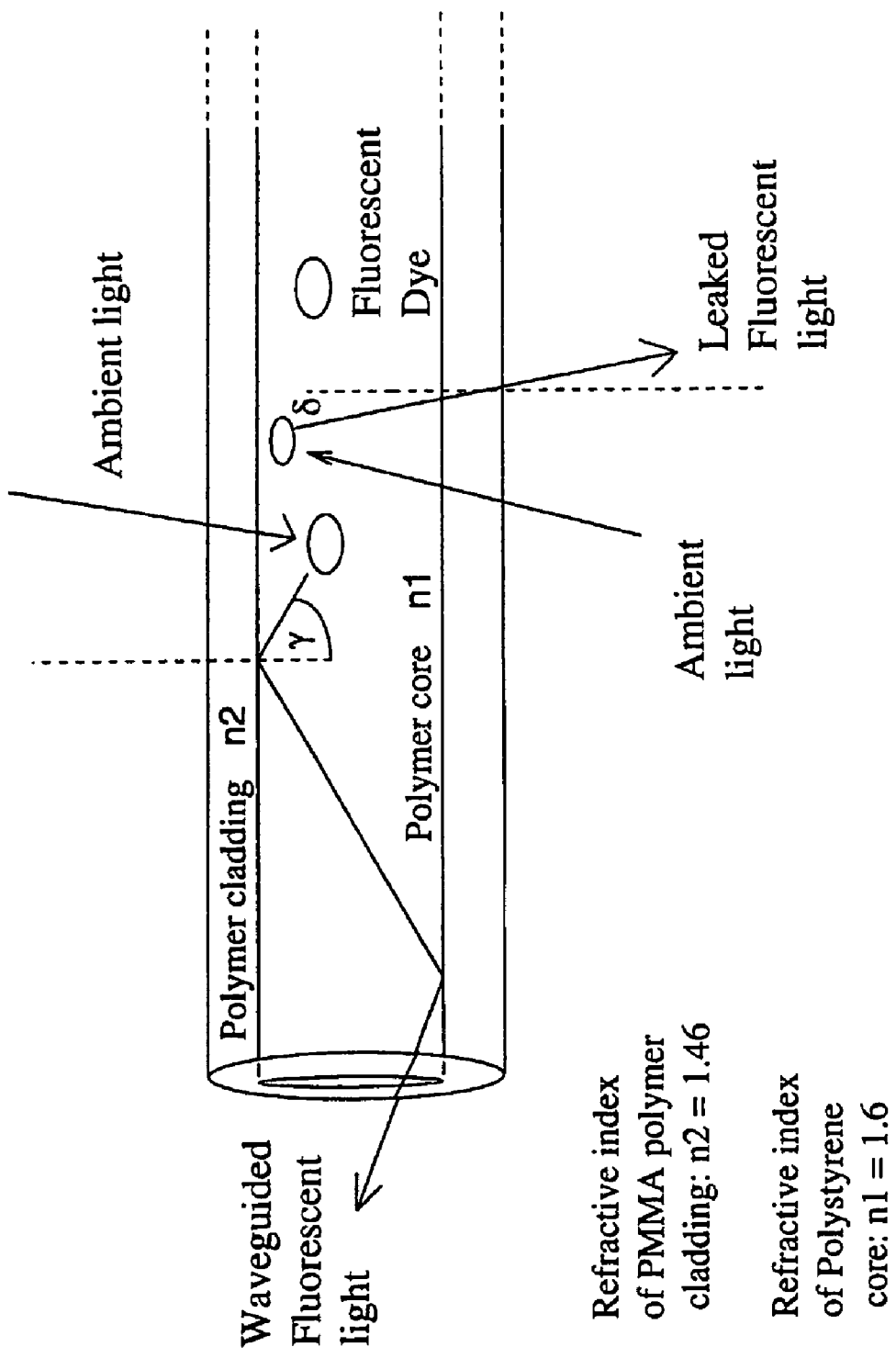
FIG. 1 describes the principles of Fluorescent Dye Doped Optical

FIG. 1: Fluorescent Dye Doped Optical Waveguide; describes the principle of operation for the fluorescent dye doped polymer optical fibre. The principle steps of operation are as follows:

1) Ambient light is absorbed by fluorescent dye,
2) Dye re-emits fluorescent light
3) Fluorescent light is waveguided if angle of incidence $\gamma >= \theta c$ where $\theta c$=critical angle for total internal reflection
4) Fluorescent light is leaked out of the waveguide if $\gamma < \theta c$ The intensity of the fluorescent light at the end of the optical waveguide depends on the following physical parameters;

Ambient light intensity

Overlap of the spectral distribution of the ambient light and the light absorption of the fluorescent dye Absorption coefficient of the dye in the light absorption region Absorption coefficient of the polymer core and polymer cladding in the light absorption region Absorption coefficient of the polymer core and polymer cladding in the fluorescent light emission region Refractive index of the polymer core Refractive index of the polymer cladding Optical uniformity of the core (scattering)

Optical uniformity of the cladding (scattering)

Geometry of the optical waveguide structure

Optimisation of these parameters results in an optical power flux emitted at a selected spectrum of wavelengths from the end of the waveguide at an increased flux than the flux of the ambient light i.e. optical amplification is obtained.

Figure 2:
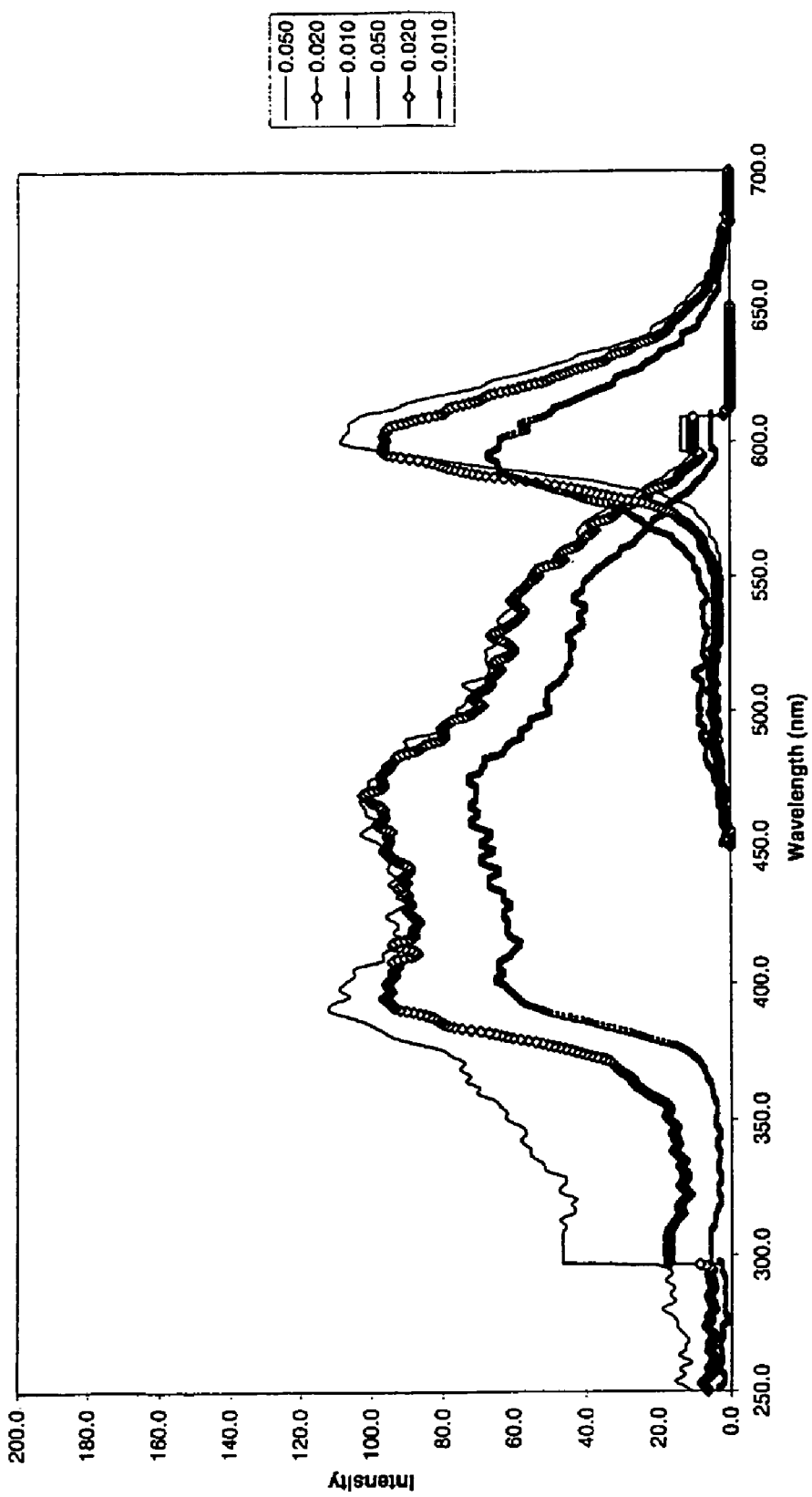
FIG. 2 shows Absorption-Emission spectra of Nile Red in Polystyrene

FIG. 2: Absorption-Emission spectra of Nile Red in Polystyrene; shows the absorption (excitation) and emission spectra of polystyrene polymer doped with 0.01, 0.02 and 0.05 wt % of Nile Red fluorescent dye. The dye absorbs the ambient light in the wavelength region from ~300 nm to ~570 nm and re-emits the light in the wavelength region from $\lambda$~570 nm to $\lambda$~670 nm. The maximum intensity of the fluorescent light occurs at $\lambda max=602$ nm i.e. the polymer emits red light.

Figure 3:
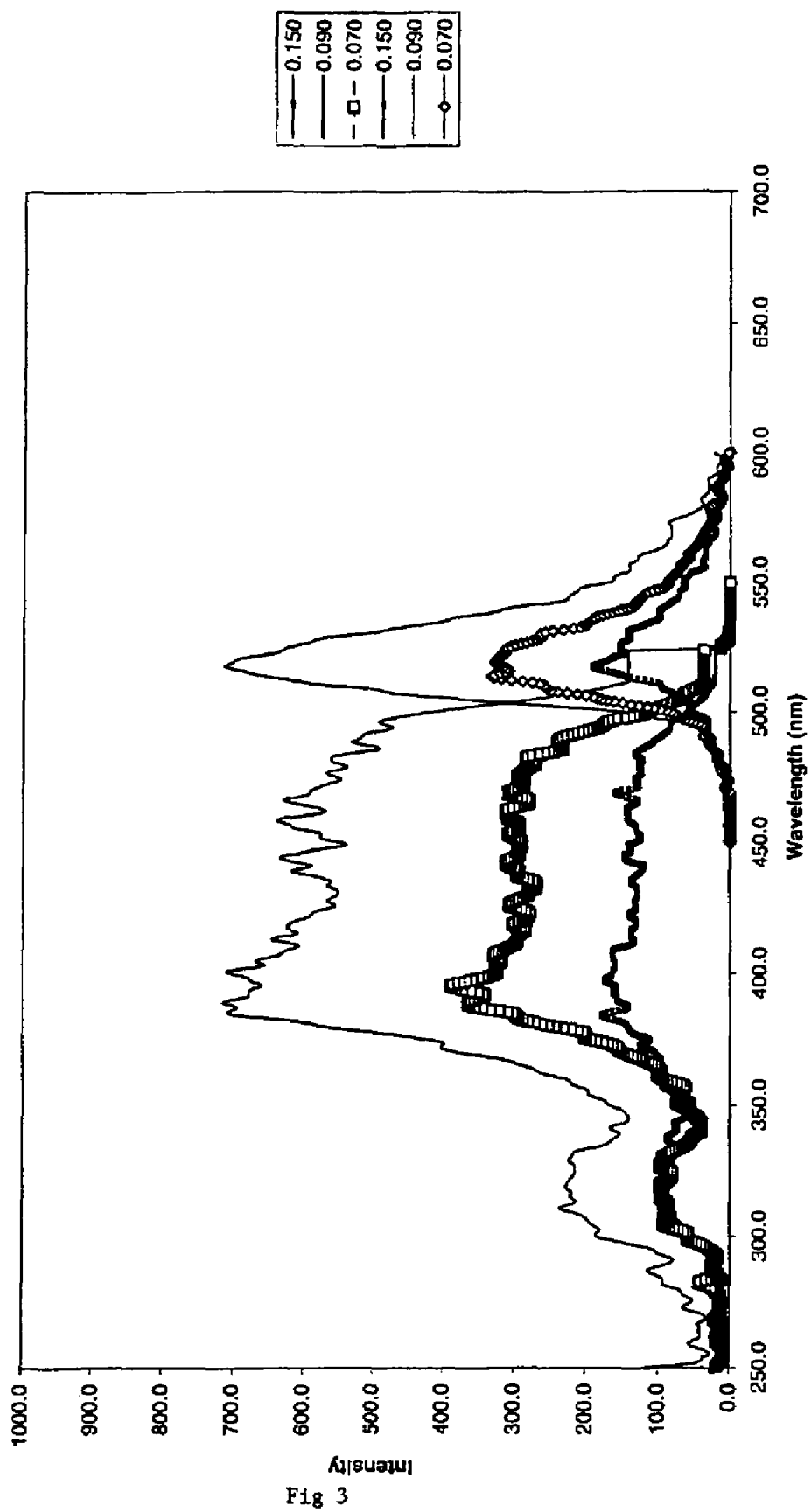
FIG. 3 shows Absorption-Emission spectra of Coumarin 6 in Polystyrene

FIG. 3: Absorption-Emission spectra of Coumarin 6 in Polystyrene; shows the absorption and emission spectra of polystyrene polymer doped with 0.07, 0.09 and 0.15 wt % of Coumarin fluorescent dye. The dye absorbs the ambient light in the wavelength region from $\lambda$~250 nm to $\lambda$~510 nm and re-emits the fluorescent light in the wavelength region from $\lambda$~510 nm to $\lambda$~560 nm. The maximum intensity for the fluorescent light occurs at $\lambda max=522$ nm i.e. the polymer emits green light.

Figure 4:
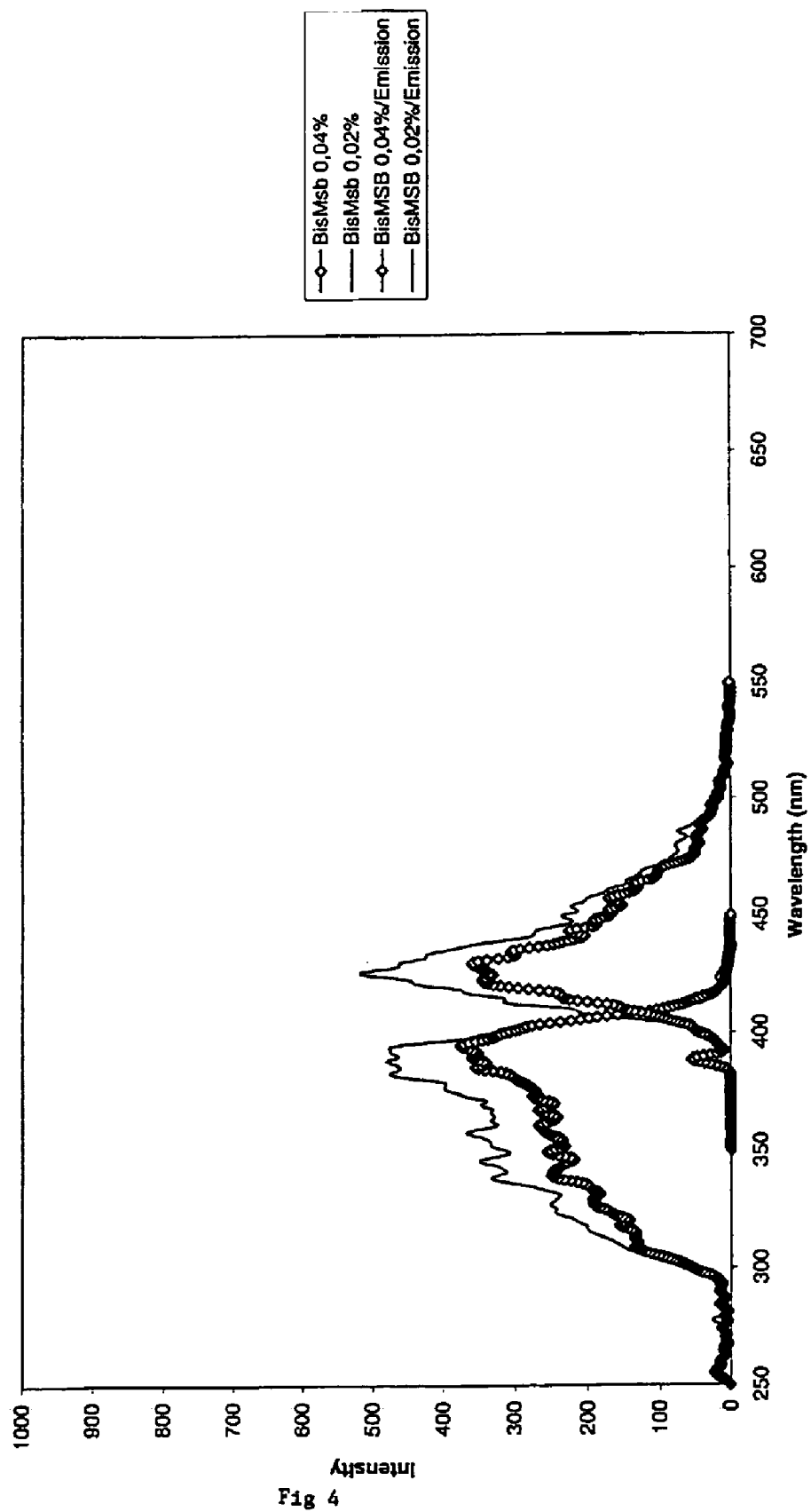
FIG. 4 shows Absorption-Emission spectra of Bis MSB in Polystyrene

FIG. 4: Absorption-Emission spectra of Bis MSB in Polystyrene; shows the absorption and emission spectra of polystyrene polymer doped with 0.02 and 0.04 wt % of Bis MSB fluorescent dye. The dye absorbs the ambient light in the wavelength region from $\lambda$~250 nm to $\lambda$~410 nm and re-emits the fluorescent light in the wavelength region from $\lambda$~410 nm to $\lambda$~470 nm. The maximum intensity for the fluorescent light occurs at $\lambda max=430$ nm i.e. the polymer emits blue light.

Figure 5:
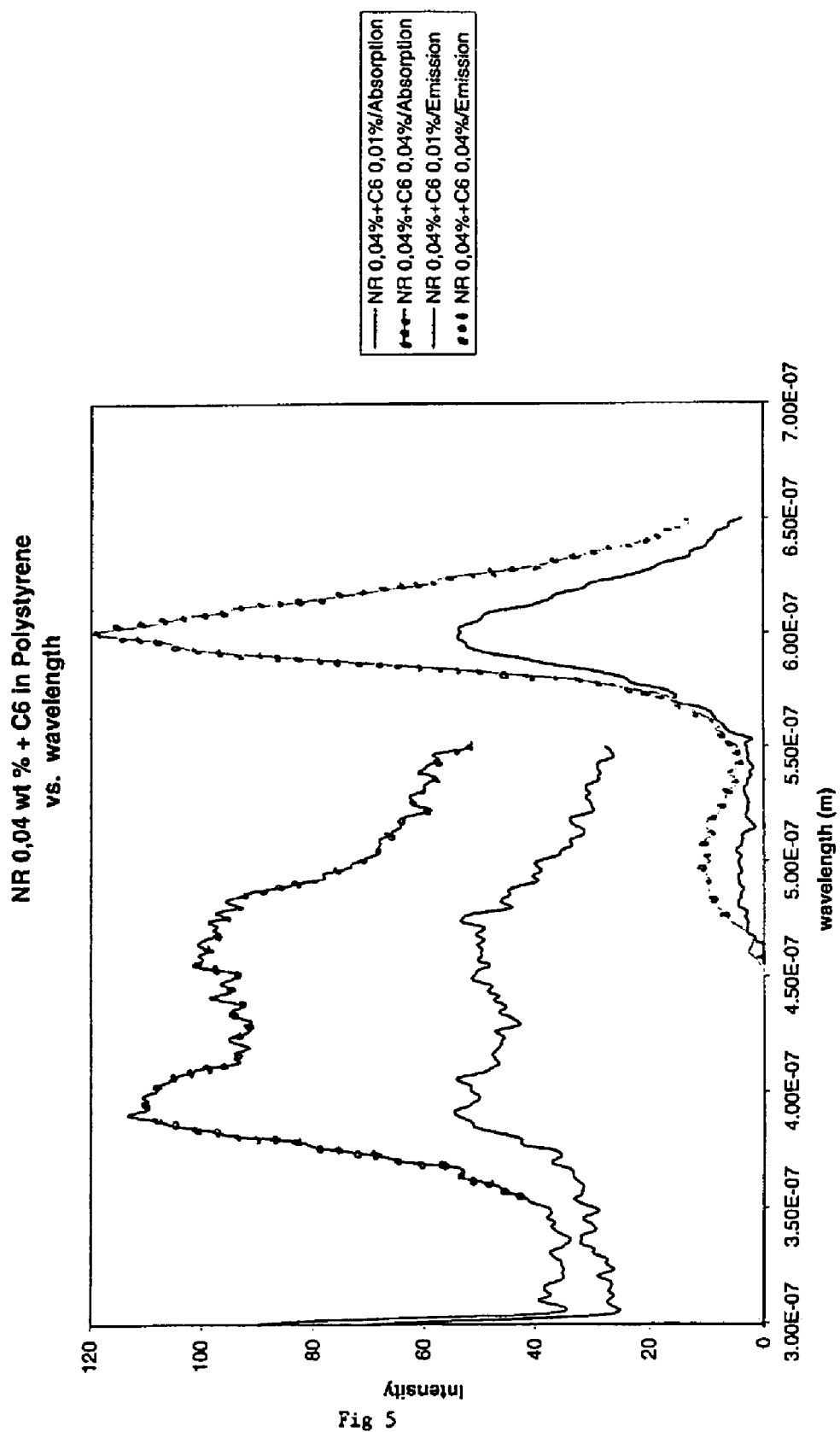
FIG. 5 shows NR 0.04 wt %+C6 in Polystyrene vs. wavelength.

FIG. 5: NR 0.04 wt %+C6 in Polystyrene vs. wavelength; shows the absorption and emission spectra of polystyrene polymer doped simultaneously with two fluorescent dye, Nile Red and Coumarin 6 respectively. FIG. 5 is also an example of increasing the efficiency of red fluorescent light emission by using larger concentration of Coumarin 6 in the two component dye mixture. The relative efficiency for light generation increases by a factor of 2.4 when the Coumarine 6 dye concentration increases from 0.01 wt % to 0.04 wt % in the dye mixture. FIG. 5 also shows that this increase in the efficiency is due to two factors; firstly due to increased absorption and secondly due to increased energy transfer of green light emission to red light emission.

Figure 6:
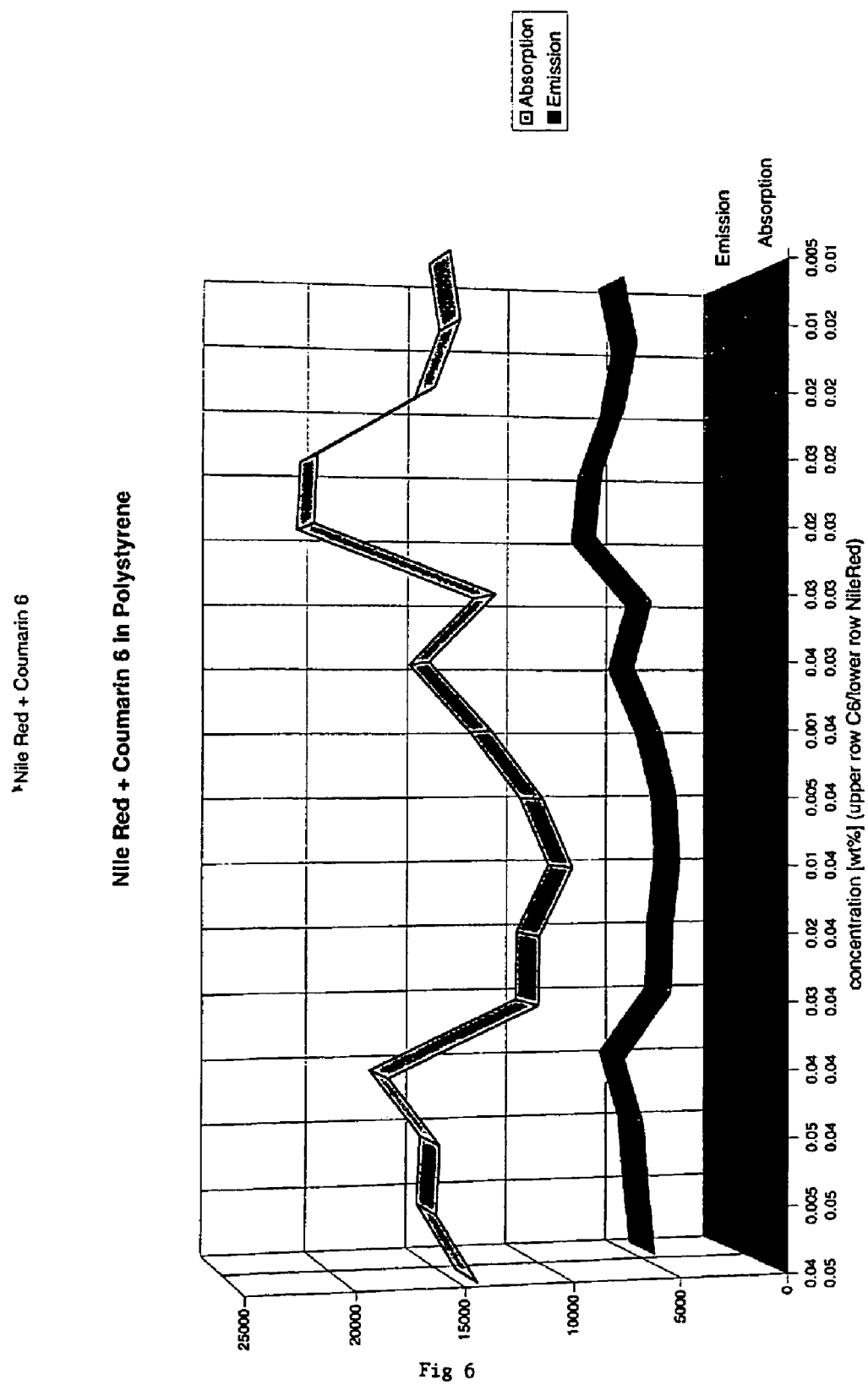
FIG. 6 illustrates Nile Red+Coumarine 6 in Polystyrene.

FIG. 6: Nile Red+Coumarine 6 in Polystyrene; summarises the relative efficiencies of ambient light absorption and fluorescent light emission as a function of the concentration of the dyes in the two component dye mixture in polystyrene host polymer. The largest efficiency for absorption and fluorescent light emission is obtained at 0.02 wt % of Coumarine 6 combined with 0.03 wt % Nile Red.

Figure 7:
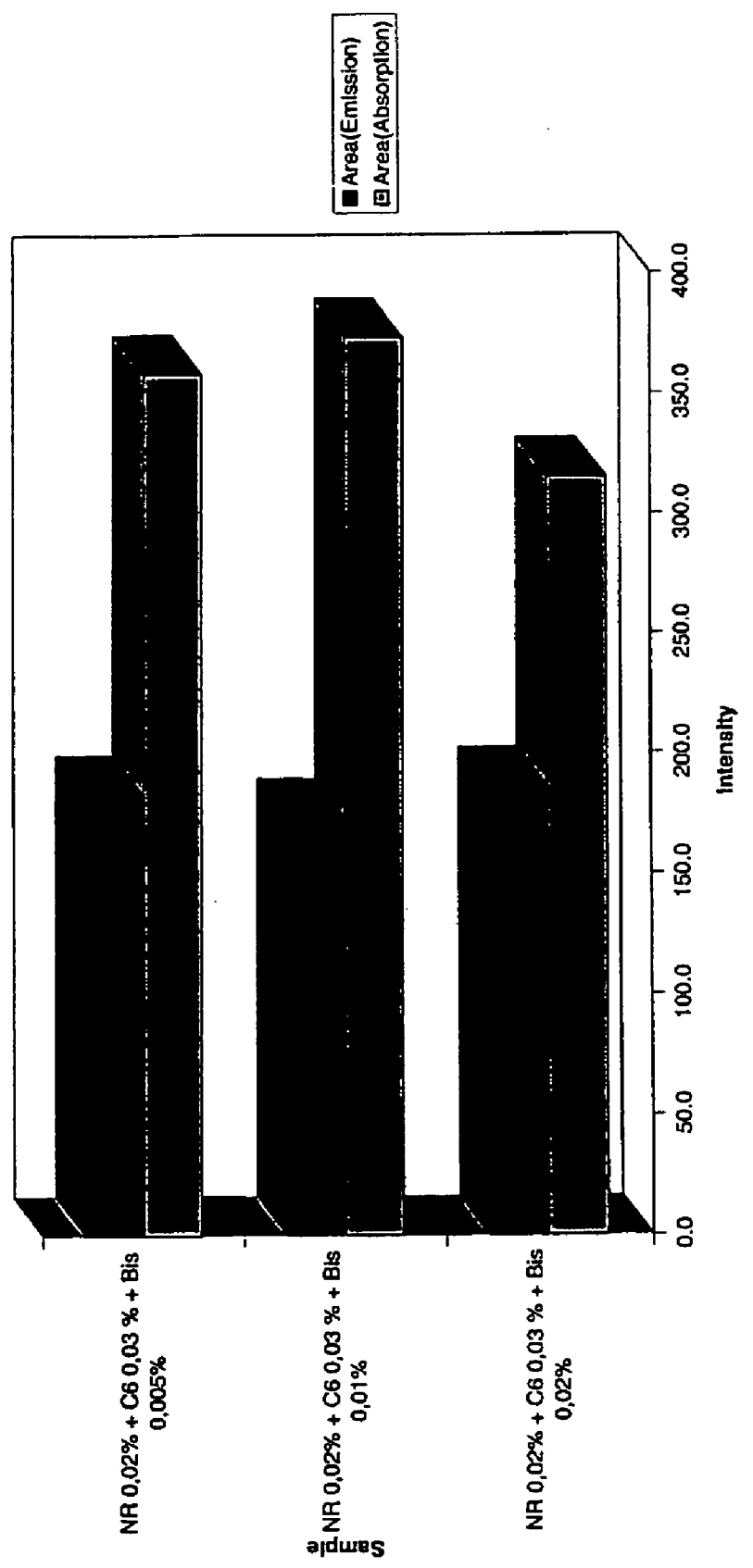
FIG. 7 illustrates Absorption—Emission Area of Nile Red 0.04%+Coumarine 6+Bis MSB.

FIG. 7: Absorption—Emission Area of Nile Red 0.04%+Coumarine 6+Bis MSB; describes the relative efficiencies for fluorescent light emission in a three component dye mixture in the polystyrene polymer host. The largest efficiency is obtained at the composition of 0.02 wt % Nile Red+0.03 wt % Coumarin 6+0.01 wt % Bis MSB. Either increasing or decreasing the concentration of Bis MSB will result in a drop in efficiency for light generation.

Figure 8:
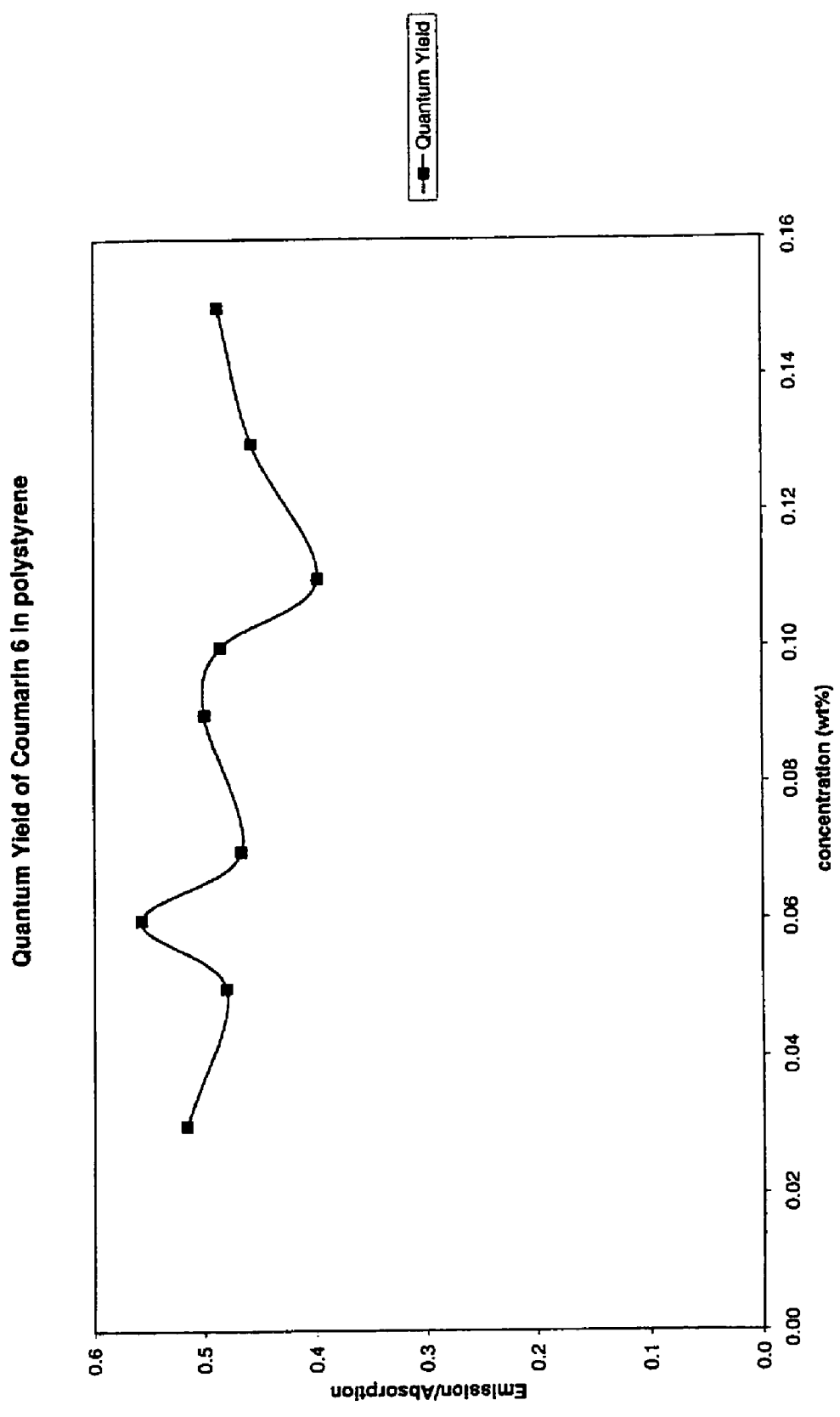
FIG. 8 illustrates Quantum Yield of Coumarin 6 in polystyrene.

FIG. 8: Quantum Yield of Coumarin 6 in polystyrene; describes the quantum Yield of coumarin 6 in polystyrene as a function of dye concentration. The optimum efficiency is obtained at 0.06 wt %.

Figure 9:
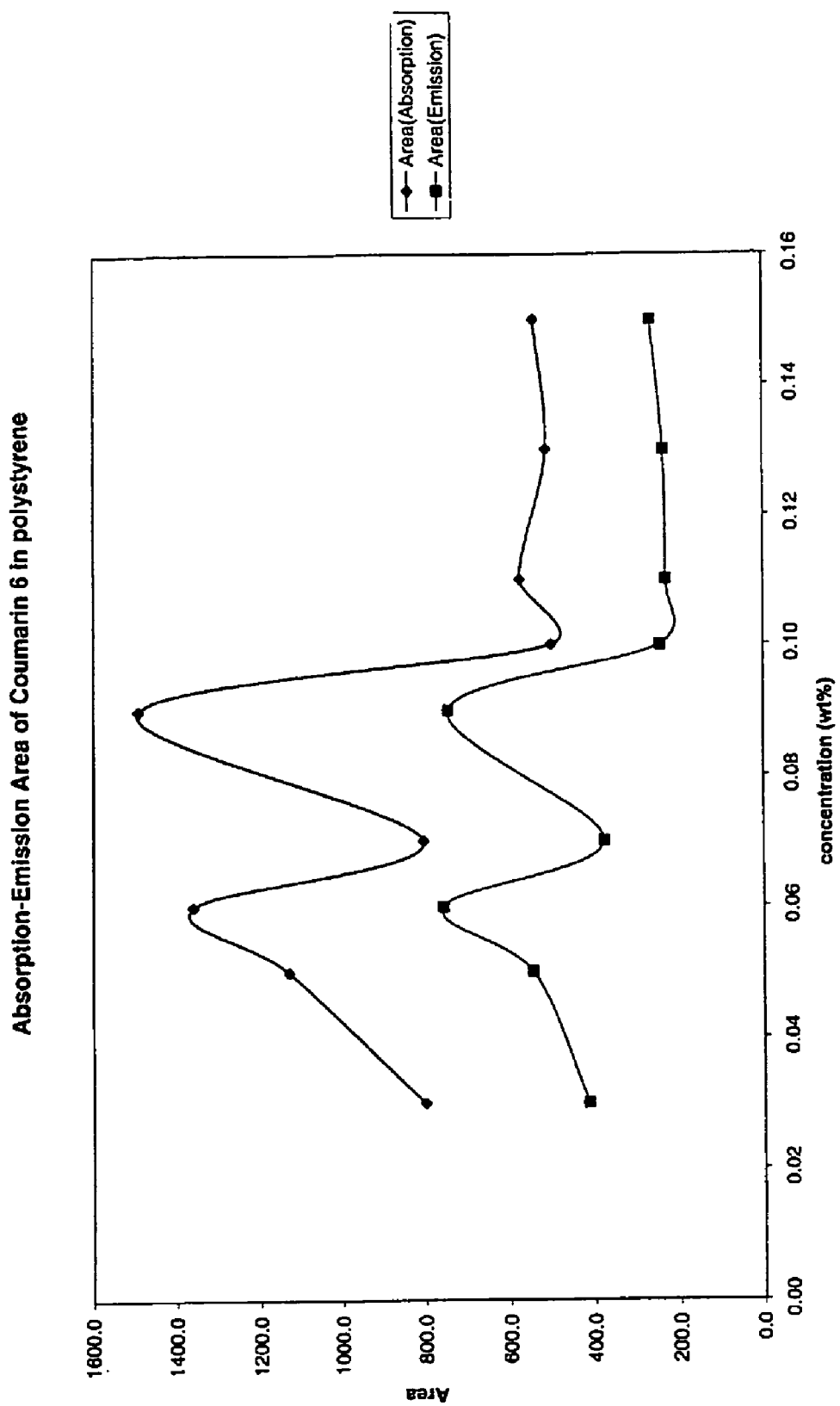
FIG. 9 shows Absorption—Emission Area of Coumarin 6 in Polystyrene.

FIG. 9: Absorption—Emission Area of Coumarin 6 in Polystyrene; describes the relative magnitudes of absorption and fluorescent light emission as a function of dye concentration. The comparison of FIG. 8 and FIG. 9 shows that the maximum efficiency for fluorescent light generation (at 0.06 wt %) is according to the maximum in the quantum yield (at 0.06wt %). FIG. 9 also shows that the maximum in absorption is not necessarily according to the maximum in light emission.

Figure 10:
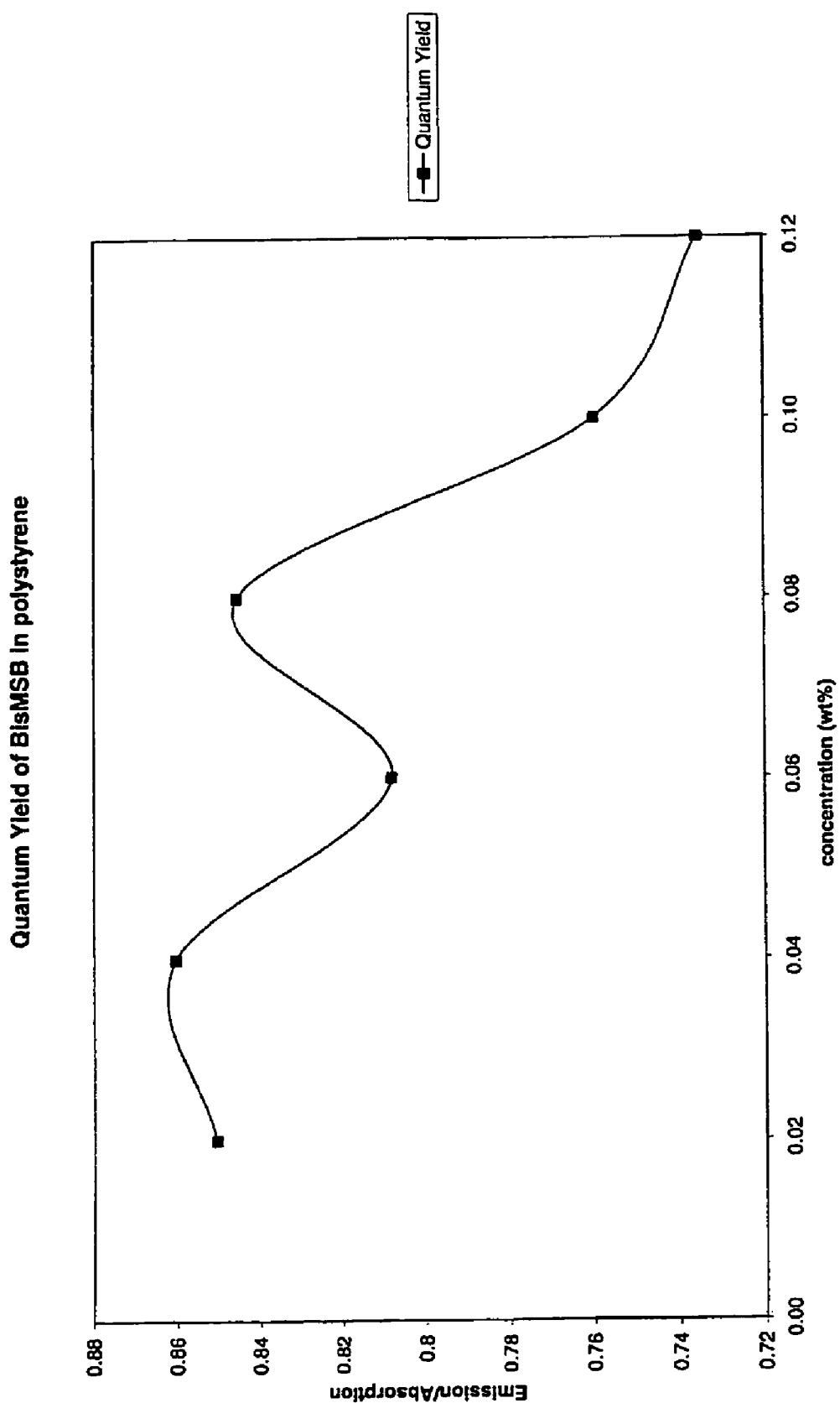
FIG. 10 shows Quantum Yield of Bis MSB in Polystyrene.

FIG. 10: Quantum Yield of Bis MSB in Polystyrene; describes the quantum a yield of blue light generation as a function of dye concentration. The best efficiency is obtained at 0.035 wt %.

Figure 11:
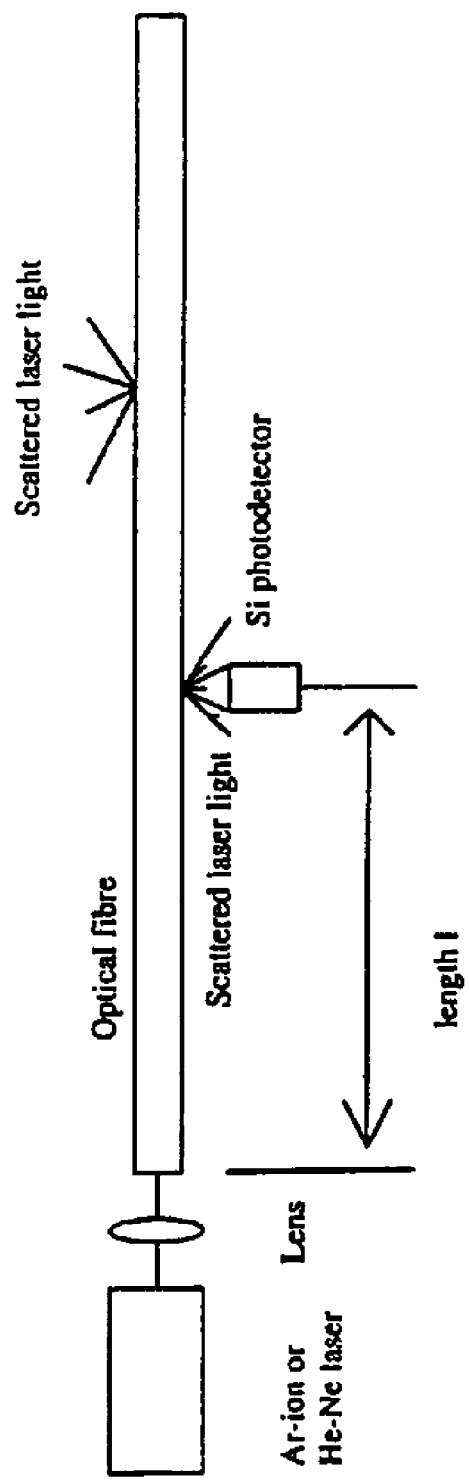
FIG. 11 illustrates Arrangement for light scattering/Absorption measurements.

FIG. 11. Arrangement for light scattering/Absorption measurements; this provides data for combined scattering and absorption profile within the fibre because the optical losses are due to two factors; a) absorption b) scattering.

Figure 12:
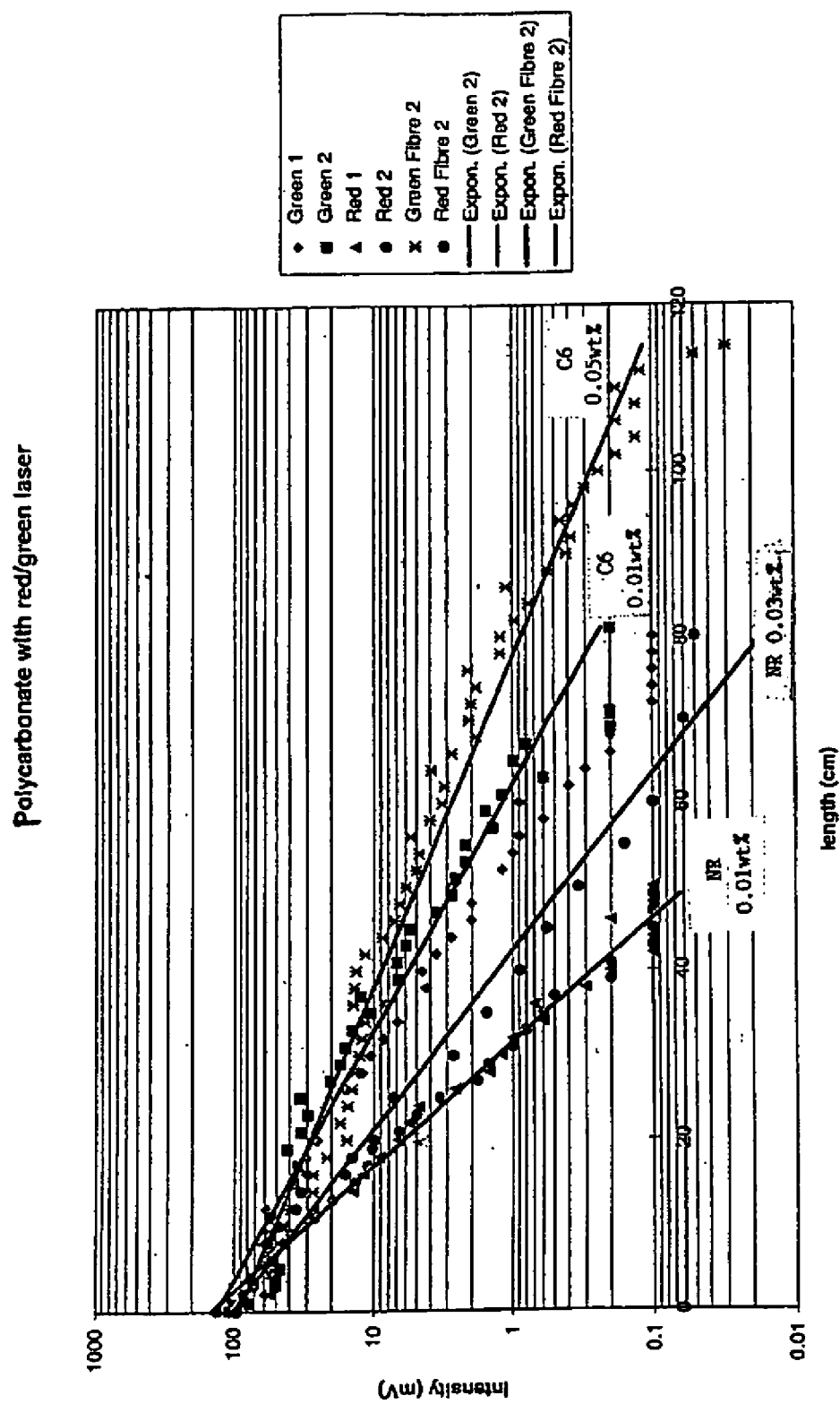
FIG. 12 describes Scattered light intensity from polycarbonate red and green fibres.

FIG. 12: Scattered light intensity from polycarbonate red and green fibers; describes the combined scattering/absorption data for fluorescent dye doped red and green polycarbonate (dye) optical fibres.

The ♦ ★ ■ symbols refer to scattering/absorption data on polycarbonate fibres doped with increasing concentration of Coumarine 6 dye. These measurements are obtained by using an Ar ion laser ($\lambda=513$ nm). The ▲ • ○ symbols refer to scattering/absorption data on polycarbonate fibres doped with increasing concentration of Nile Red dye. These measurements are obtained by using a He—Ne laser ($\lambda=632$ nm).

All of the curves show the scattered light intensity as a function of the length l from the end of the fibre. The plots are linear in the semilogarithmic scale thus confirming the exponential nature of the light decay along the fibre. Generally the Red fibres (Nile Red NR doped polycarbonate) have more loss (measured at $\lambda=632$ nm) than the Green fibres (Coumarine 6, C6 doped polycarbonate), measured at $\lambda=513$ nm. This is due to the dispersion of the refractive index (the refractive index is smaller in the red spectral region than in the green spectral region). FIG. 12 also shows the effect of the increase of the dye concentration on the scattering/absorption properties. As a particular dye concentration (Nile Red or Coumarine 6) increases, the scattering/absorption losses decrease (slope is becoming less) This is demonstrated by comparing the concentration of NR at 0.01 wt % and 0.03 wt %, and the comparison of C6 at at 0.01 wt % and 0.05 wt % respectively. The increased efficiency for fluorescent light collection therefore is due to the combined effect of increasing the dye concentration and the increase in the refractive index of the polymer (dye) guest host core.

Figure 13:
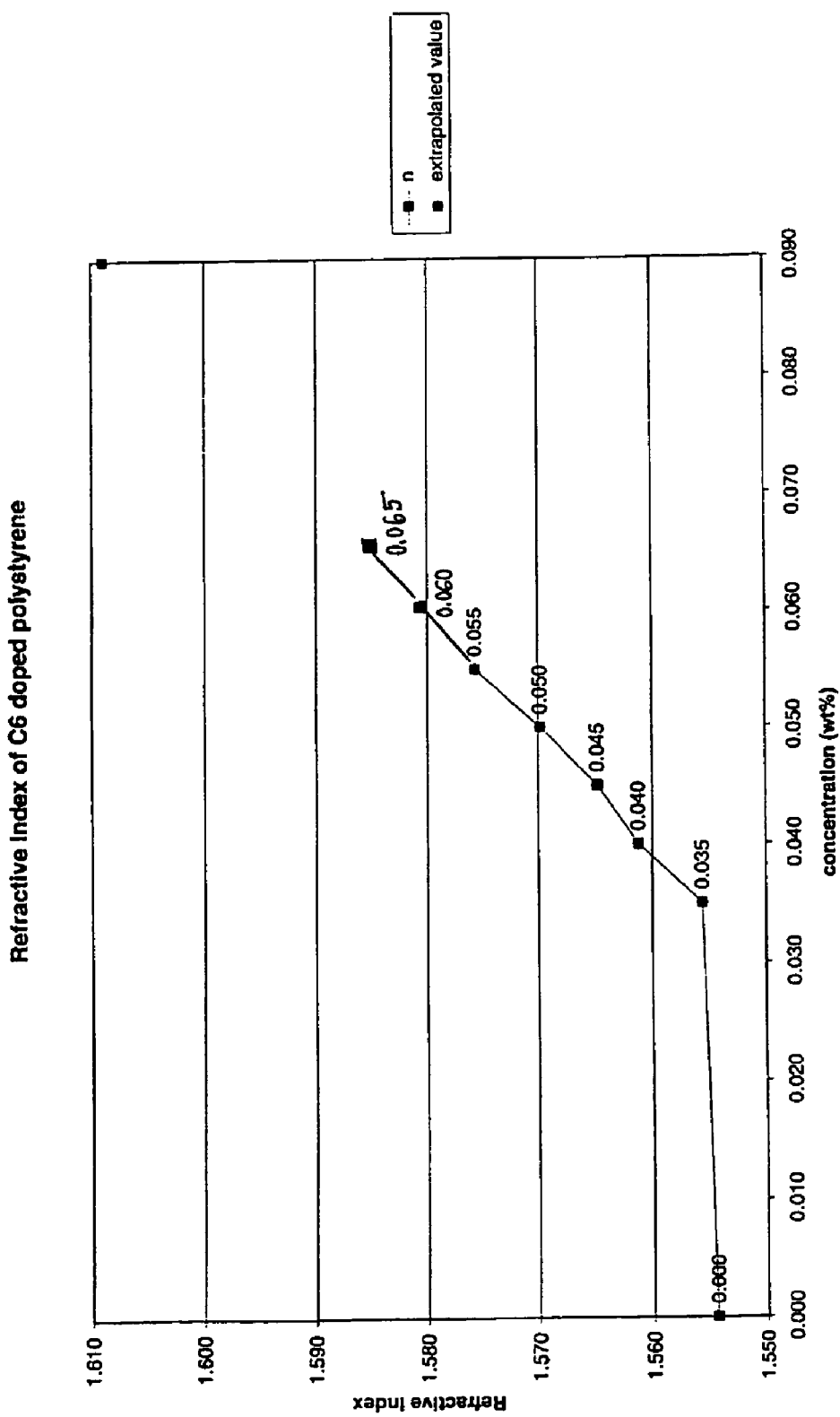
FIG. 13 demonstrates Polycarbonate Fibres/Polycarbonate with red/green laser

FIG. 13: Polycarbonate Fibres/Polycarbonate with red/green laser; demonstrates the increase of the refractive index of the polycarbonate/C6 polymer/dye guest host system as a function of the C6 dye concentration. There is a linear dependence of the refractive index from n=1.555 to n=1.585 on the dye concentration in the range between 0.035 wt % and 0.065 wt %.

Figure 14:
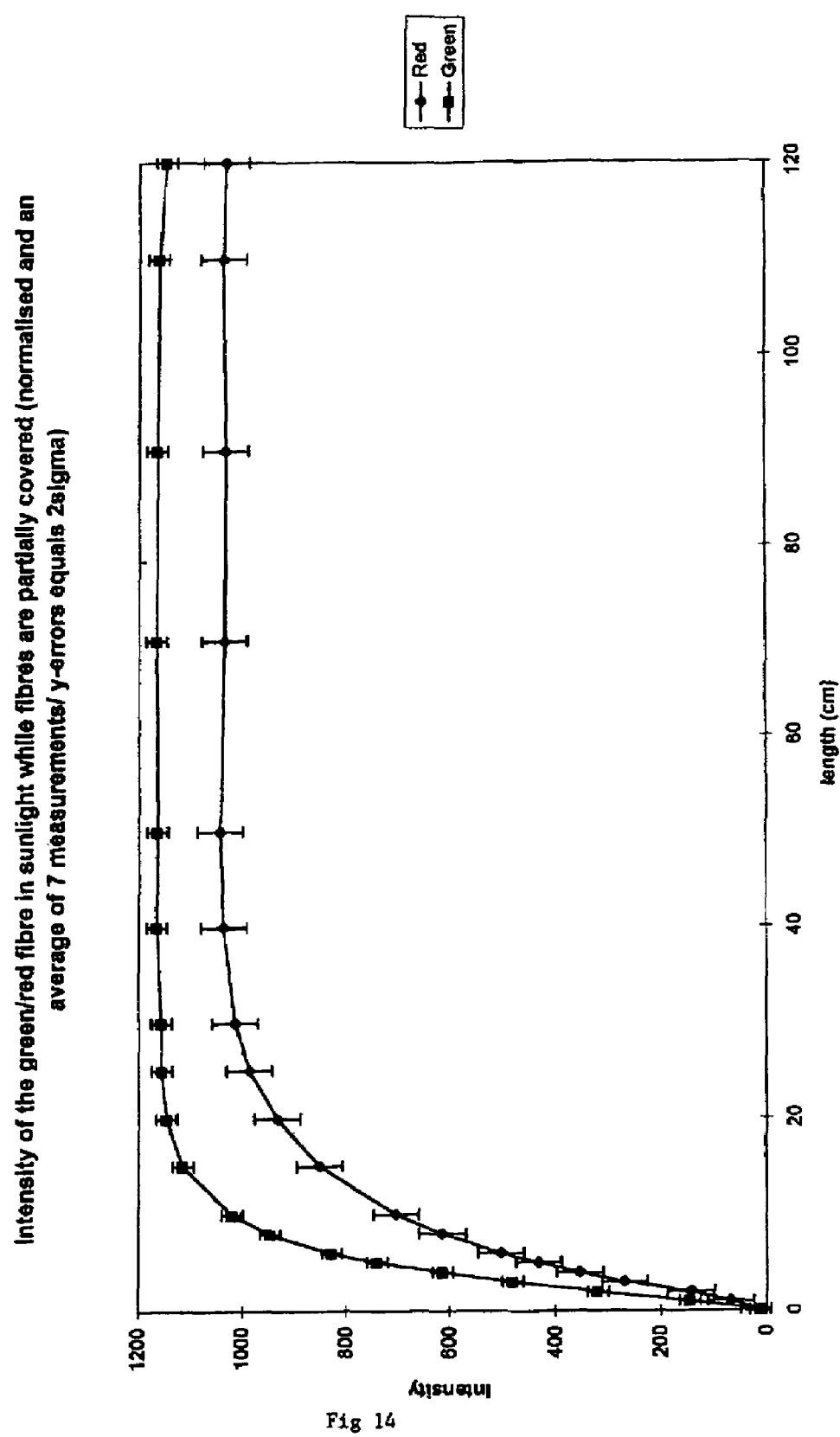
FIG. 14 demonstrates Intensity of green/red fibre in sunlight while fibres are partially covered (normalised and an average of 7 measurements/y-errors equal 2 sigma.

FIG. 14: Intensity of green/red fibre in sunlight while fibres are partially covered (normalised and an average of 7 measurements/y-errors equal 2 sigma); demonstrates that the fluorescent light generation under sunlight excitation is saturated after ~60 cm length of the fibre. This is because the extra light generated in the middle of the fibre is scattered out or absorbed within the core. Comparison of FIG. 14 with FIG. 13, shows a good agreement, confirming the nature of light losses.

Figure 15:
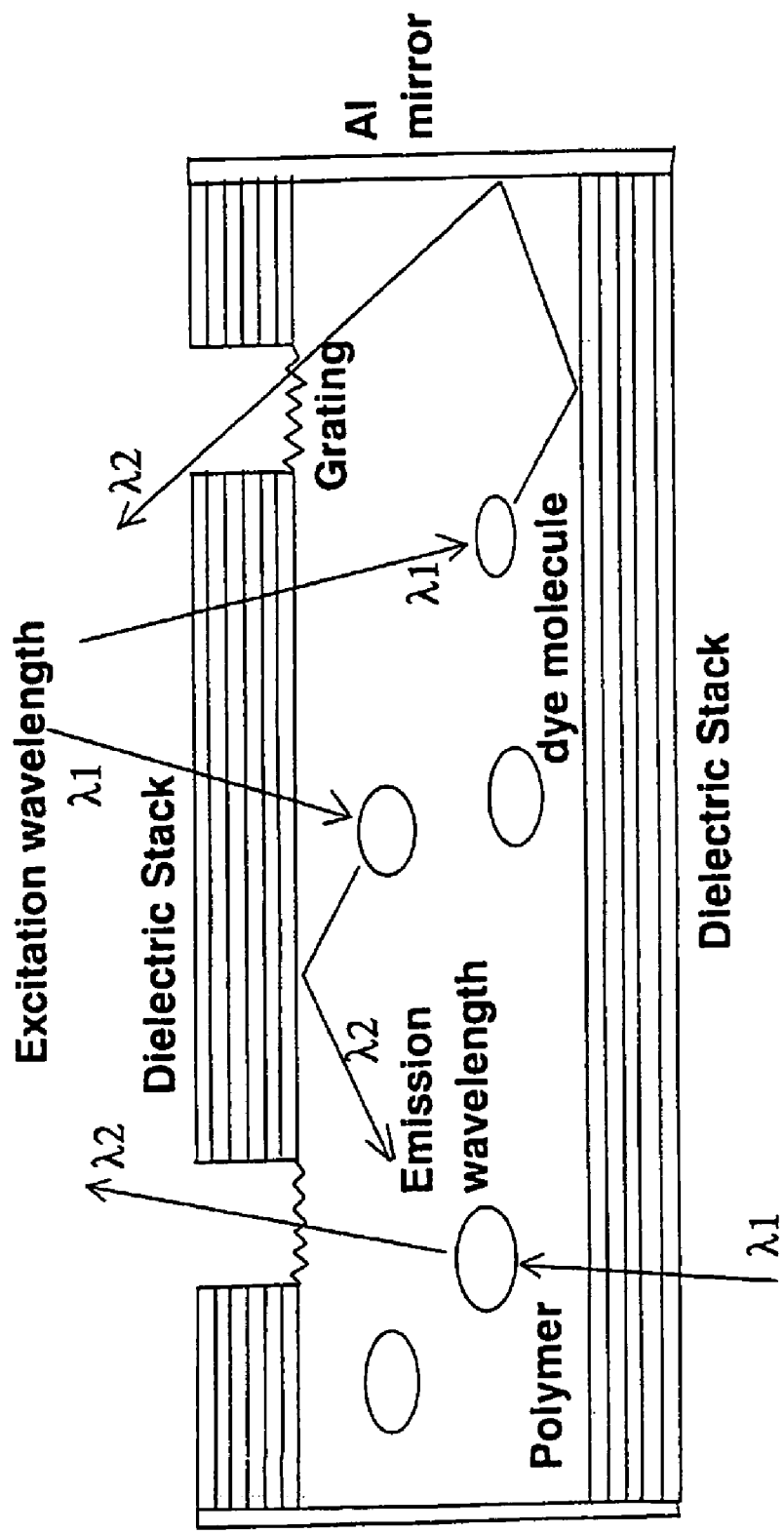
FIG. 15 shows Structure of Light Emitting Polymer in combined reflective and transmissive mode.

FIG. 15: Structure of Light Emitting Polymer in combined reflective and transmissive mode; shows the structure of a polymer and the positioning of a dielectric stack relative to it.

Figure 16:
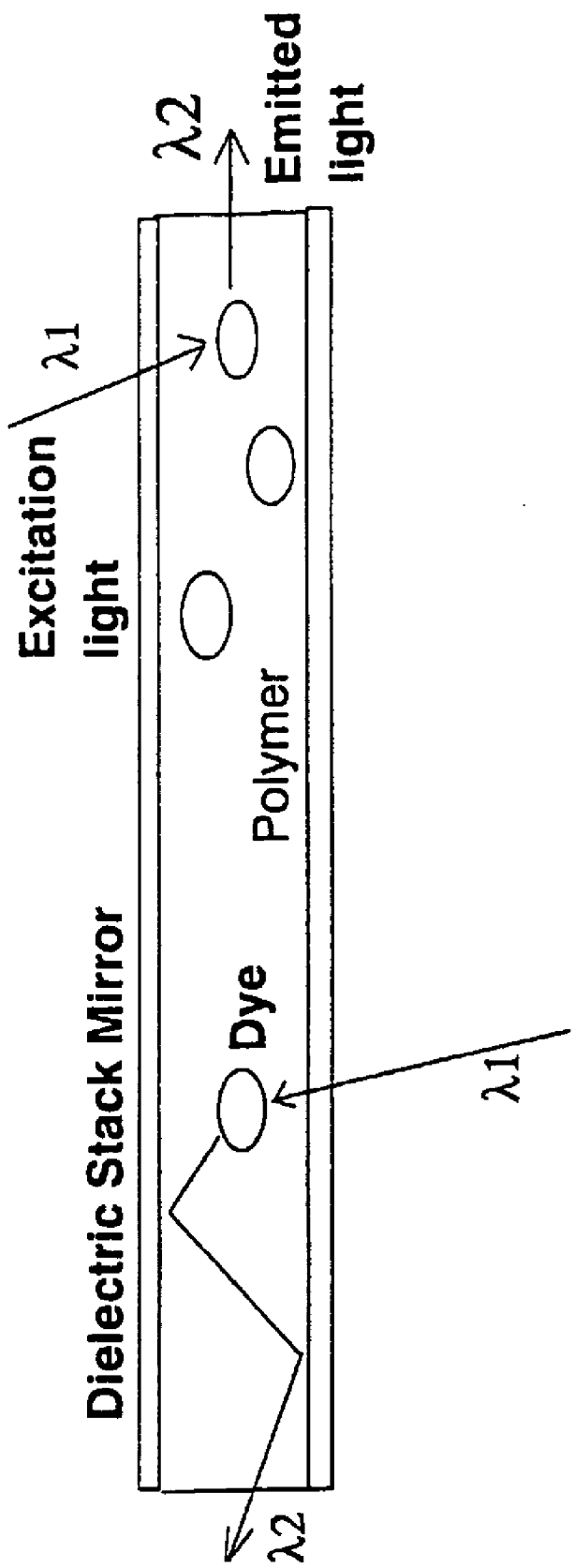
FIG. 16 shows the structure of Light Emitting Polymer in the Edge emitting.

FIG. 16: Structure of Light Emitting Polymer in the Edge emitting Mode; shows the dielectric stack use in relation to an optical fibre polymer, where the dielectric stack mirror provides a band pass antireflection—reflection layer which acts as an absorption free band pass filter for transmitting all of the spectral region of the ambient light for excitation of the fluorescent dye but reflects all of the emitted fluorescent light back to the sample.

Figure 17:
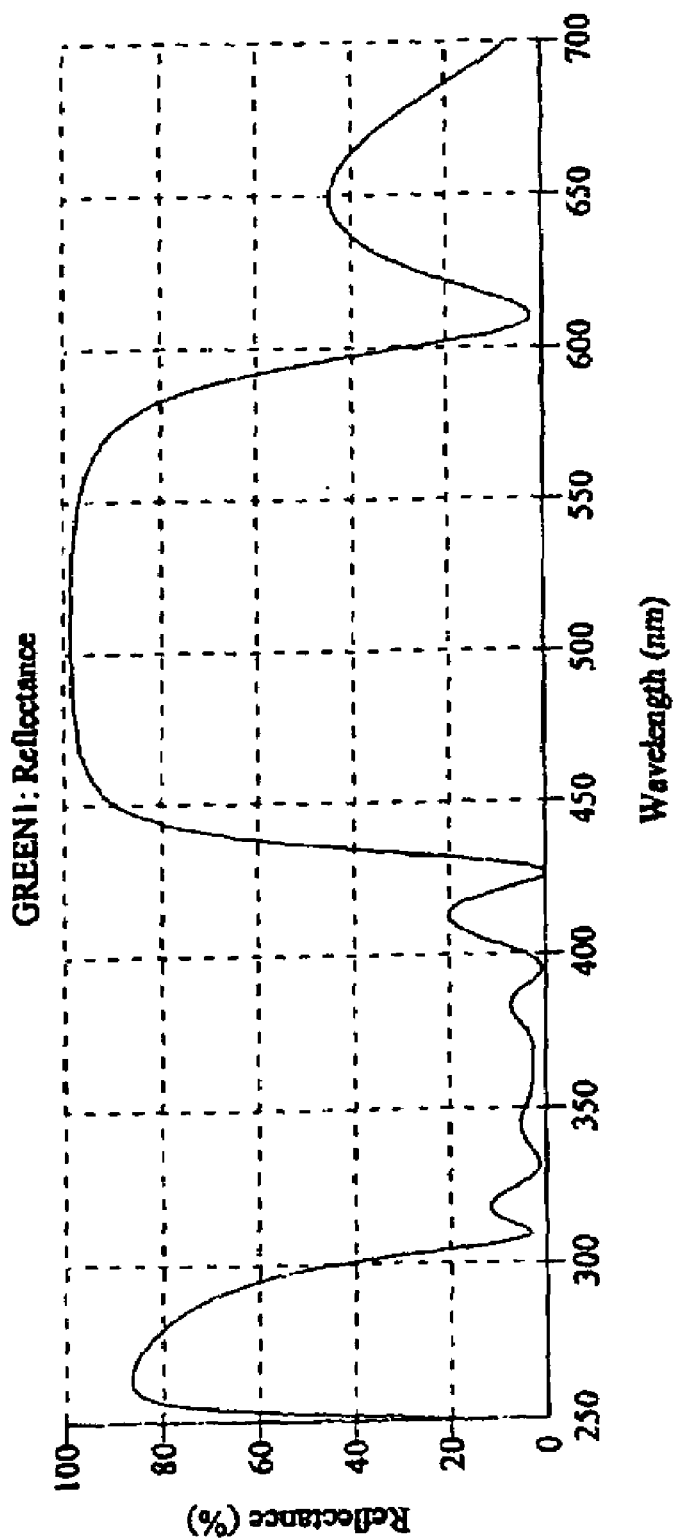
FIG. 17 demonstrates Green Reflectance.

FIG. 17: GREEN Reflectance; demonstrates the Reflectance spectrum of the dielectric stack described in Table II. The reflectance is nearly zero in the wavelength region from ~350 nm to 430 nm. This means that this spectral region of ambient light can be used for excitation of Coumarine 6. Comparison of FIG. 17 with FIG. 3. shows that the zero reflection region corresponds to the spectral region of absorption (excitations) region (~350 nm to 480 nm) for Coumarine 6). Alternatively, the reflectance is nearly 100% for the spectral region from 450 nm to 550 nm. Comparison of FIG. 14 with FIG. 3 shows that the high reflectance region corresponds to the spectral region of green fluorescent light emitted by C6. This means that the emitted light is fully reflected back to the bulk of the flat panel.

Figure 18:
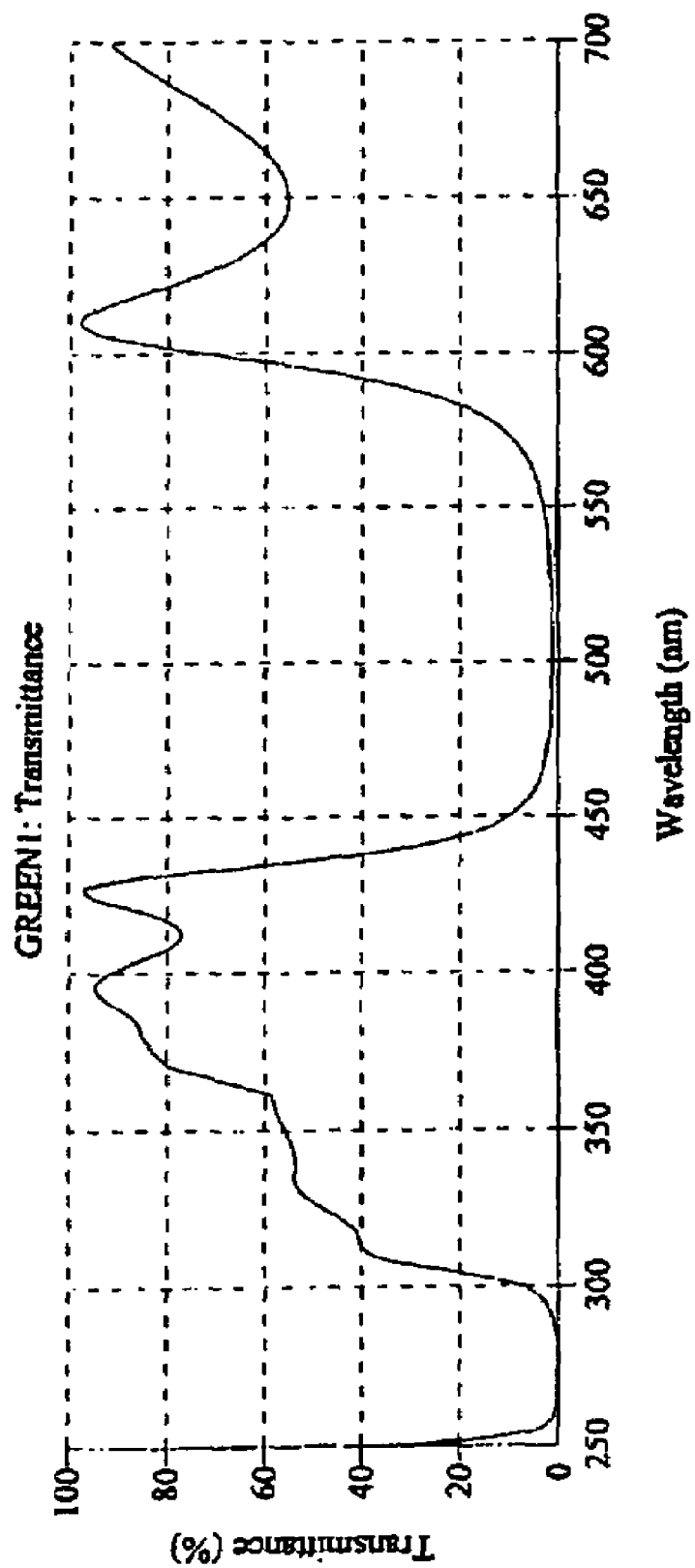
FIG. 18 demonstrates GREEN1 Transmittance.

FIG. 18: GREEN1 Transmittance; demonstrates the Transmittance spectrum of the same dielectric stack as described in Table II. The Transmittance is ~80% in the spectral region from ~350 nm to 430 nm. This allows the light to be transmitted for excitation. On the other hand, the transmittance is nearly zero in the spectral region from 450 nm to 550 nm. Comparison of FIG. 18 with FIG. 3 shows that the zero transmittance region corresponds to the spectral region of green fluorescent light emitted by C6. The panel looks deep blue in appearance as it transmits only blue light in the visible region, therefore, the contrast between the uncovered (bright green) and dielectric stack covered (dark blue) areas of the flat panel can be substantial, which is suited for display applications.

Figure 19:
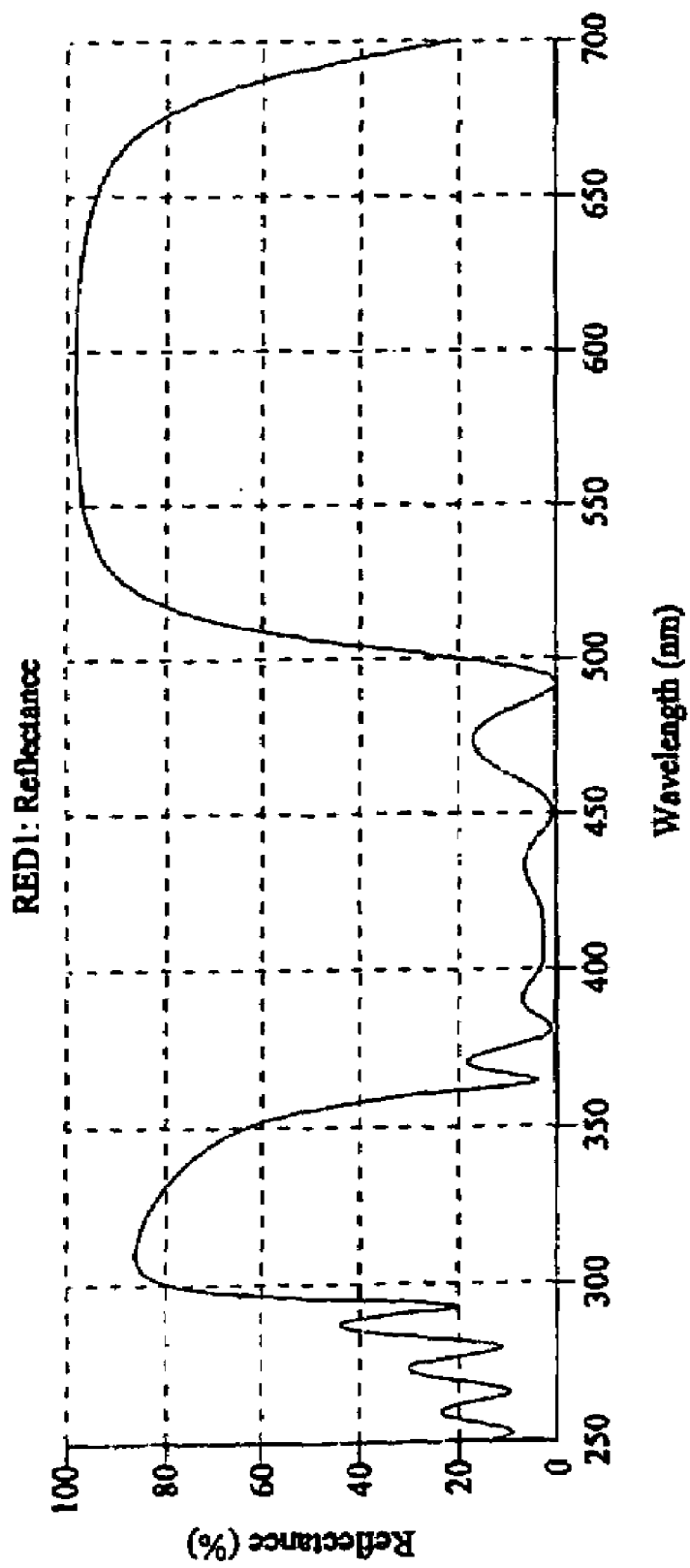
FIG. 19 demonstrates RED1 Reflectance

FIG. 19: RED1 Reflectance; demonstrates the reflectance spectrum of a dielectric stack for a dielectric stack mirror designed with specification detailed in Table III. The reflectance has a nearly zero value in the spectral region from ~350 nm to ~500 run. Comparison of FIG. 19 with FIG. 2 shows that the zero reflectance region corresponds to the absorption region of the Nile Red dye in Polystyrene. Alternatively, nearly 100% reflectance region (~530 nm to 650 nm) corresponds to the tight emission spectral region of the Nile Red in Polystyrene.

Figure 20:
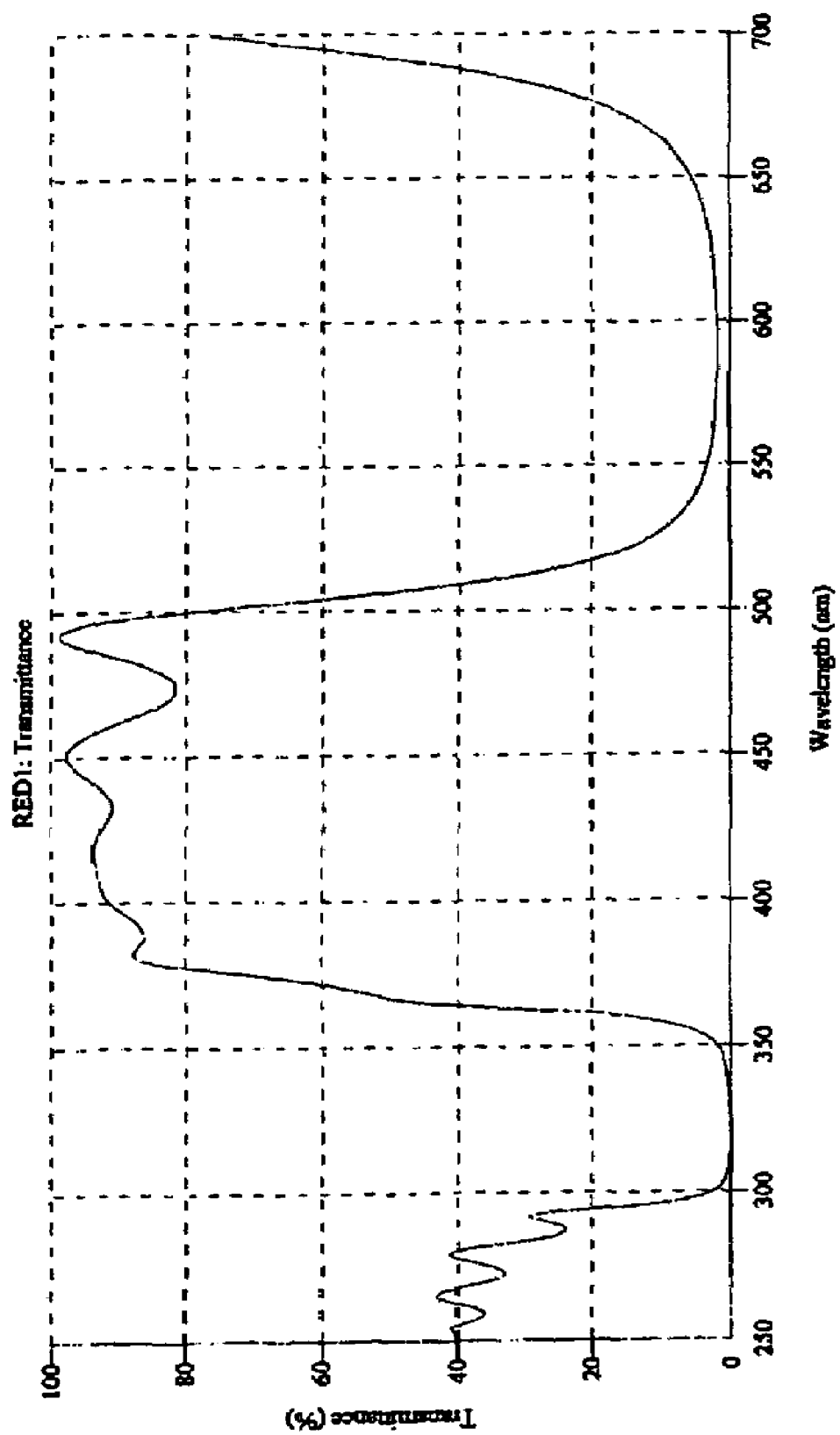
FIG. 20 demonstrates RED1 Transmittance

FIG. 20: RED1 Transmittance; demonstrates the transmittance spectrum of the same dielectric stack as described in Table III. Comparison of FIG. 20 with FIG. 2. confirms that the high transmittance region corresponds to the spectral region of Nile Red absorption in Polystyrene.

Figure 21:
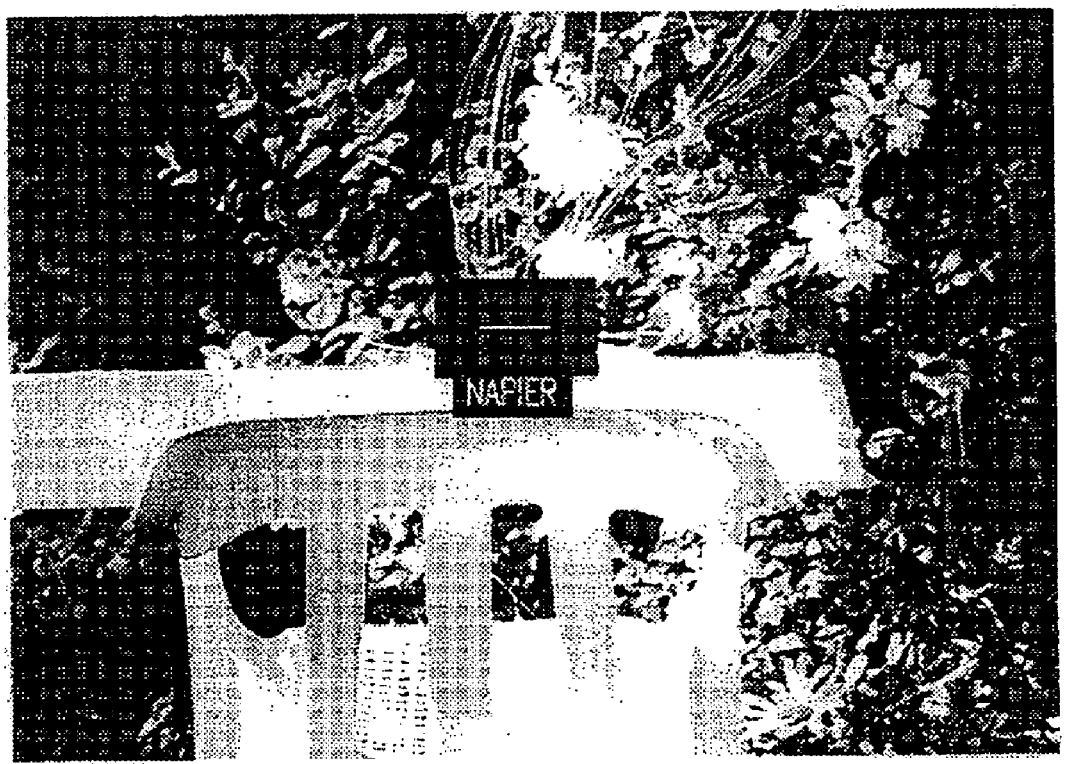
FIG. 21 shows a display in full sunlight conditions.
Figure 22:
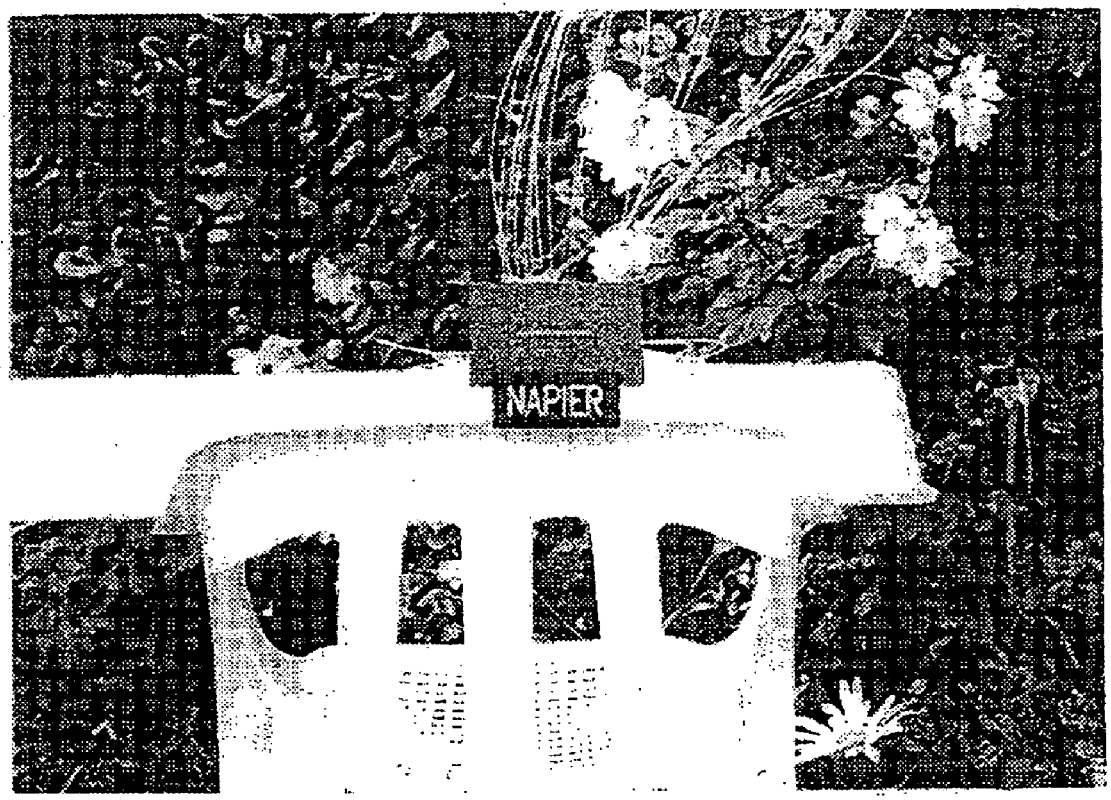
FIG. 22 shows a display in cloudy conditions
Figure 23:
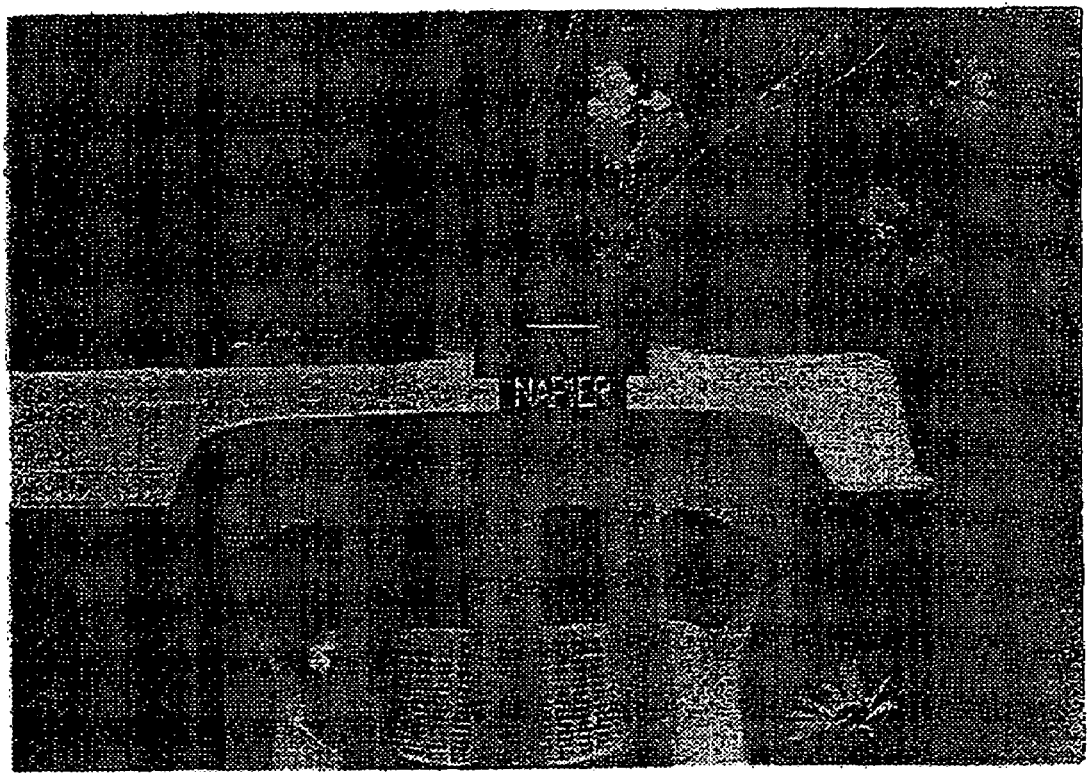
FIG. 23 shows a display in late evening condition (two hours after sunset).

FIGS. 21, 22 and 23 show a constant contrast of fluorescent polymer based display; where FIG. 21 shows the display in full sunlight conditions, FIG. 22 shows the display in cloudy conditions and FIG. 23 shows the display in late evening condition (two hours after sunset). The photographs shown in FIGS. 20, 21 and 22 demonstrate the concept of "constant contrast" between the light emitted from the end of the fibres and the intensity of the ambient light.

It is already stated earlier that the contrast between the light power flux emitted from the end of the fibre and the ambient light power flux is constant because this property does not depend on the ambient light intensity. The photos clearly show that the contrast between the "NAPIER" sign, the blue line above the Napier sign and the ambient light intensity remains fairly constant down to very low level of illumination (2 hours after sunset).

Additionally, any transparent polymer can be used as core and/or cladding material. In practice the choice is limited by the compatibility of the polymer core with the fluorescent dye and the requirement for employing high refractive index material for the polymer core and low refractive index material for the polymer cladding. Polymers are favoured over glasses for several reasons such as low temperature processing capability (for fibres and polymer mouldings), compatibility with organic fluorescent dyes and good mechanical properties (strength and flexibility).

In principle, any fluorescent dye compatible with any transparent polymer can be used for this purpose. In practice the choice is limited by the compatibility of the fluorescent dye with the polymer core, the required colour, and the stability and lifetime. The contrast between the light power density emitted from the polymer and the light power density of the ambient light remains constant because this parameter is not effected by ambient Light conditions as long as they are above a critical level and instead relies on the material parameters.

Typical examples for the core are; polymethylmethacrylate (PMMA), polystyrene, polycarbonate, cyclic olefin copolymers, or any similar transparent polymer, commercially available as either monomers of polymers from Aldrich, BASF, Bayer, GE Plastics, Ticona or other suppliers.

Typical examples for the fluorescent dye are; Coumarin 6 (green fluorescent dye), Coumarin 7 (green fluorescent dye), Coumarine 314 (green fluorescent dye) 1,8-Diphenyl-1,3,5, 7,-octatetrene (yellow fluorescent dye) Nile Red (red fluorescent dye), Bis-MSB (blue fluorescent dye), Cresyl Violet Perchlorate (red fluorescent dye), Sulforhodamine 101 (red fluorescent dye), Sulforhodamine 640 (red fluorescent dye), commercially available from Aldrich or Exciton, or other suppliers.

The fluorescent dyes can be incorporated into the core polymers by any suitable method, including:
1. Dissolving the dyes in the monomer and then carrying out bulk polymerisation to produce a cast sheet or rod preform (for fibre drawing).
2. Melt compounding of dyes into polymer using either a batch internal mixer, or continuous compounding equipment (such a single screw extruder or a twin screw extruder).

Typical initiators such as AIBN and Benzoyl Peroxide are also available commercially from Aldrich or other suppliers.

Method of Polymerisation

Polymerisation is carried out directly from the monomer (with dye dissolved in it) or more often from a monomer-polymer syrup approximately 20-40 weight percent of polymer. Prior to polymerisation, the fluorescent dye is dissolved in the monomer. This is a preferred method for dissolution because of the simplicity of the process and because there is no need to apply an extra solvent which would decrease the efficiency of the dye in the host matrix.

The fluorescent dye concentration in the monomer is in the range of 0.005 weight % to 0.2 weight %. The polymerisation is carried out in the temperature range from 20° C. to 50° C. in steps over 5 hours and keeping the material for 12 hours at 50° C. The slow process helps control the exotherm effect during polymerisation. If the material is overheated during the polymerisation, volatile monomer can produce bubbles inside the material resulting in defects and optical non-uniformities within the final polymer product. Therefore it is important to control the polymerisation temperature range. Alternatively other polymerisation techniques may be used, for example using ultra-violet light. By such a method rods can be cast in glass tubes to produce polymer (dye) rods approximately 25 mm in diameter and 1 metre in length suitable for drawing into optical fibres.

Optical fibre drawing of the rods can be based on the rod in tube method using a process similar to that used for glass optical fibre (though at a very much lower temperature). In the preferred embodiment a polystyrene (Coumarin 6) rod is placed inside a PMMA tube. The rod in tube structure is surrounded by an oven which has a temperature around 265° C. The oven heats up the rod in tube structure and consequently the viscosity of both the rod and the tube decreases to a value close to that of the liquid phase. Simultaneously, with the heating, a tension is applied via a wheel and belt system to the rod in tube structure. The combined effect of temperature and tension results in fibres drawn from the rod in tube. The internal core is drawn from the rod and the outer cladding is drawn from the tube. Polystyrene has a higher refractive index so it is used as the core material and polymethylmethactrylate has a lower refractive index so it is used as the cladding material.

Other techniques can also be used to produce the polymer (dye) -polymer, core-clad fibre, such as continuous extrusion. The core is extruded and the cladding applied by: coextrusion at the die-head; downline by crosshead die extrusion (similar to that used for wire covering); or solution coating. A typical example of co-extruded fibre is polycarbonate core with fluoropolymer cladding, but the same method can be used for polystyrene fibres clad with polymethylmethacrylate.

In general a polycarbonate (dye) core with a suitable low refractive index fluoropolymer such as FEP or amorphous Teflon, (both produced by DuPont) for cladding can be used to make fluorescent optical fibres.

Table I illustrates several examples giving values of light power flux from optical fibres at an ambient sunlight power flux of $Ps=0.05$ $W/m^2$.

EXAMPLES

As a first example of the invention FIG. 1 describes the structure of the light emitting polymer in reflective mode. The transparent polymer is chemically doped or blended with a fluorescent dye. The fluorescent dye should have a high quantum efficiency for converting natural light or indoor light into some visible colour. The bottom surface and edges of the polymer are covered with a highly reflective additional layer which acts as a mirror and ensures that all light entering through the top surface is fully reflected back into the polymer.

The top surface of the polymer is covered with a dielectric stack mirror which comprises two dielectric films with alternating high and low refractive indices. This dielectric stack serves as an interference filter allowing 100% transmission of light from the air to the polymer for the wavelengths used for excitation of the fluorescent dyes doped within the polymer. The dielectric stack however has a near 100% reflection for light wavelengths emitted from the fluorescent dyes doped within the polymer. The dielectric layers can be vacuum evaporated, spin coated or sputtered onto the surface of the polymer.

Alternatively, thin films of two different polymers with two different refractive indices can also be applied to the polymer surface sequentially vacuum pressed and/or thermally treated for each layer. This method allows larger areas to be covered by the dielectric stack mirror. Alternatively, cladding can also be applied for the same purpose although the efficiency is not as good as with dielectric stack mirror.

This arrangement, coupled with the fact that the polymer layer itself acts as a guide for light generated inside the polymer (polymer refractive index about 1.5, air refractive index about 1), ensures that the polymer layer acts as a "light-trap" for wavelengths used for excitation and light emission from the fluorescent dye embedded in the polymer matrix.

On the other hand the fluorescent light emitted from the dye can be coupled out from the polymer at the top surface by emitting or removing the dielectric stack mirror at a given surface area and by making an uneven or grated surface at the polymer/air interface. The grating structure should be maximised for maximum diffraction for the emitted fluorescent light wavelength.

The intensity of the fluorescent light I1 ($mW/cm^2/nm$) emitted from the dye doped polymer (at a given dye concentration) at the grated surface is linearly proportional to the R1 at a given dye concentration;

$I1 \sim R1$=total light collecting surface area ($cm^2$)/total grated area ($cm^2$)

This means that the larger ratio (R1) produces more fluorescent light. On the other hand, the contrast of the display defined as the intensity of the fluorescent light from the grated surface divided by the intensity of the ambient light is constant because this ratio is only dependent on the geometry of the display device (at a given dye concentration). This feature is particularly useful under variable ambient light conditions.

The device described above can be used to display letters, characters, symbols etc by using natural or artificial light from the environment and converting this light into a characteristic colour of fluorescent light and directing it (by total internal reflection or by interference) into the display area. By selecting the appropriate dye-polymer combination and by maximising the ratio of light collecting area divided by light emitting display area of a contrast of 10:1 or larger can be achieved for display purposes. This contrast is independent from the ambient lighting conditions. It is emphasised again that this device does not consume any electrical power. However, the device will not provide enough light for the display purposes when the ambient light intensity decreases below a critical level. In this case a conventional light source can be switched on to provide light for excitation and consequently displaying information. This electrical source does not illuminate the display directly and works in an indirect fashion.

An alternative example of the invention is shown in FIG. 15. By replacement of the bottom mirror layer with a dielectric stack mirror, identical to the one applied to the top surface, a combined reflective and transmissive mode of light collection and display operation is also possible. The principle of operation is shown in FIG. 15. A combined reflective and transmissive mode of operation is particularly useful for displays fixed on the inside of shop windows. Again as in the reflective mode of operation, the contrast for displaying information is independent of ambient lighting conditions.

A third mode of operation is shown in FIG. 15. A dielectric stack mirror is applied on both sides of the transparent polymer-dye matrix but no side mirrors are applied. Consequently the fluorescent light generated inside the polymer will be waveguided towards the edges. The value of fluorescent light intensity I2 ($mW/cm^2/nm$) at the edges is directly proportional to the R2;

$I2 \sim R2$=total light collecting surface area ($cm^2$)/edge area ($cm^2$) at a given concentration of fluorescent dye.

In summary the devices described above can be used to display letters, characters, symbols etc by using natural or artificial light from the environment and converting this light into a characteristic colour of fluorescent light and directing it by total internal reflection or by interference into the display area. Through selection of the appropriate dye polymer combination and by maximising the ratio of light collecting area dividing by light emitting display a contrast of 10:1 or larger can be achieved for display purposes. This contrast being independent from ambient lighting conditions.

The key elements of the invention are:

A method in which fluorescent dye doped polymer based optical wave-guide structures such as optical fibres, arrays of fibres, woven arrays of fibres, rods, sheets, folded sheets and moulded shapes of arbitrary geometry can be used to fabricate display and/or illumination elements for a range of applications such as road signs, traffic signs, safety signs, fixed advertisements, animation, dynamic display elements, toys, games lamps etc., without the usage of external electrical power thus saving energy.

A method in which display elements fabricated from fluorescent dye doped polymer wave-guide structures can provide a constant contrast between the light power flux emitted from the wave-guide structure and the light power flux of the ambient light. This is a unique feature as compared to conventional electrically powered display elements.

A method in which a dielectric stack mirror layer fabricated on the surface of flat panels, sheets, and/or moulded surfaces and any other optical elements described above can be used to improve the efficiency and the contrast of those optical elements.

A method in which the efficiency of the fluorescent dye doped polymer based optical wave-guide structures can be improved by optimising the refractive index of the cladding layer.

A method in which fluorescent dye doped polymer based optical wave-guide structures can provide optical amplification of the emitted fluorescent light by optimising the wave-guide geometry, the composition of the dye (or dye mixtures) the dye concentrations, and the polymer host.

A method in which fluorescent dye doped polymer based optical wave-guide structures can provide a range of colours in the visible spectrum (from red to blue) by absorbing the ambient light (artificial and/or sunlight) and converting them into the required colour specification depending on the specific choice of the dye and the polymer.

Methods for a range of specific applications using fluorescent dye doped optical wave-guide structures which are detailed in the application section Methods for a range of applications in which a range of specific applications using fluorescent dye doped optical wave-guide structures can be combined with established-generic technologies.

Applications

'24 Hour' Road Signs

Figure 24:
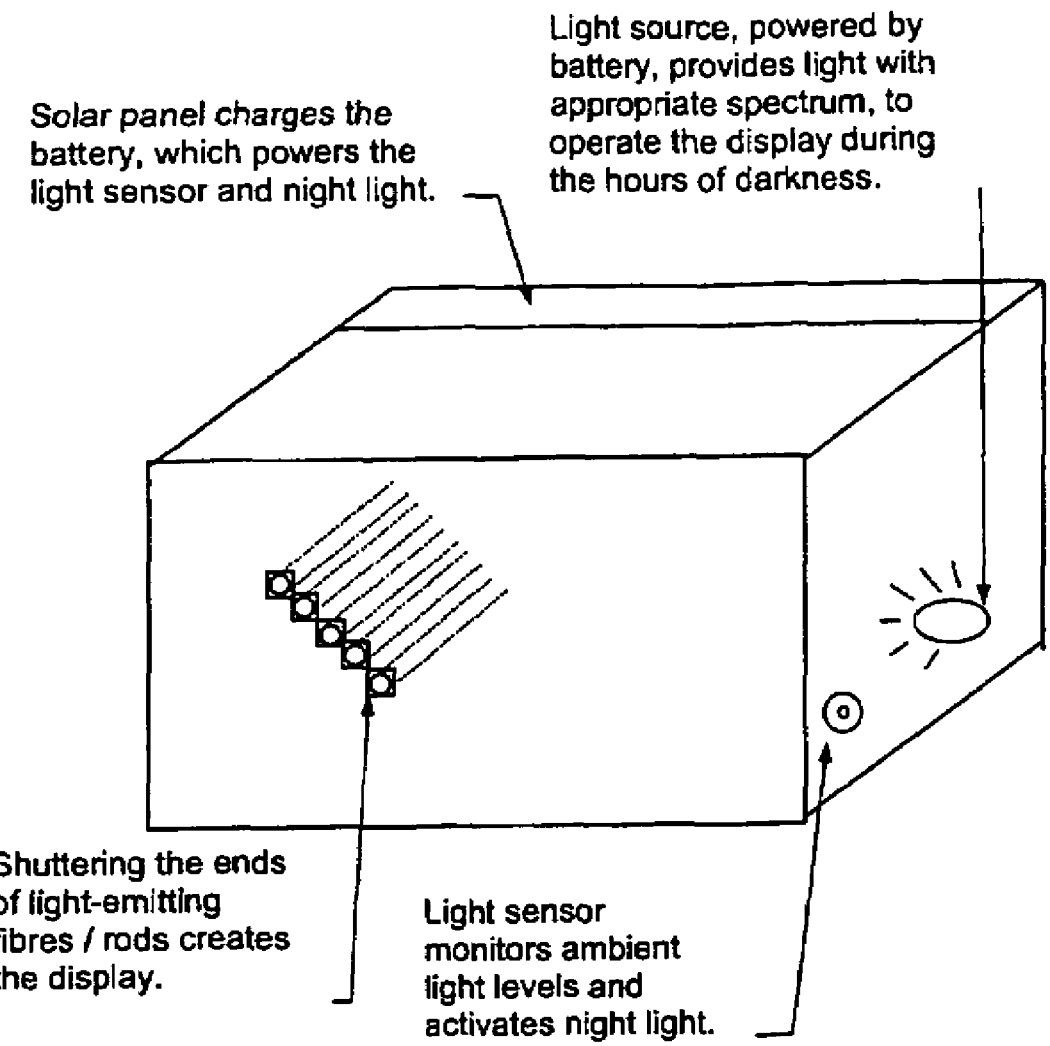
FIG. 24 shows a 24 hour road signage display.

An array of light-emitting rods, each one having a shuttering mechanism at its end, is housed in an enclosure, along with a solar panel and battery which is used to power a light during the hours of darkness. This light is activated by a light sensor and provides an appropriate spectrum for energy conversion by the rods. The solar panel charges the battery during the daylight hours, when the light source is not required. An example of such a device and the principles involved, is shown in FIG. 24.

24 Hour' Traffic Lights

Figure 25:
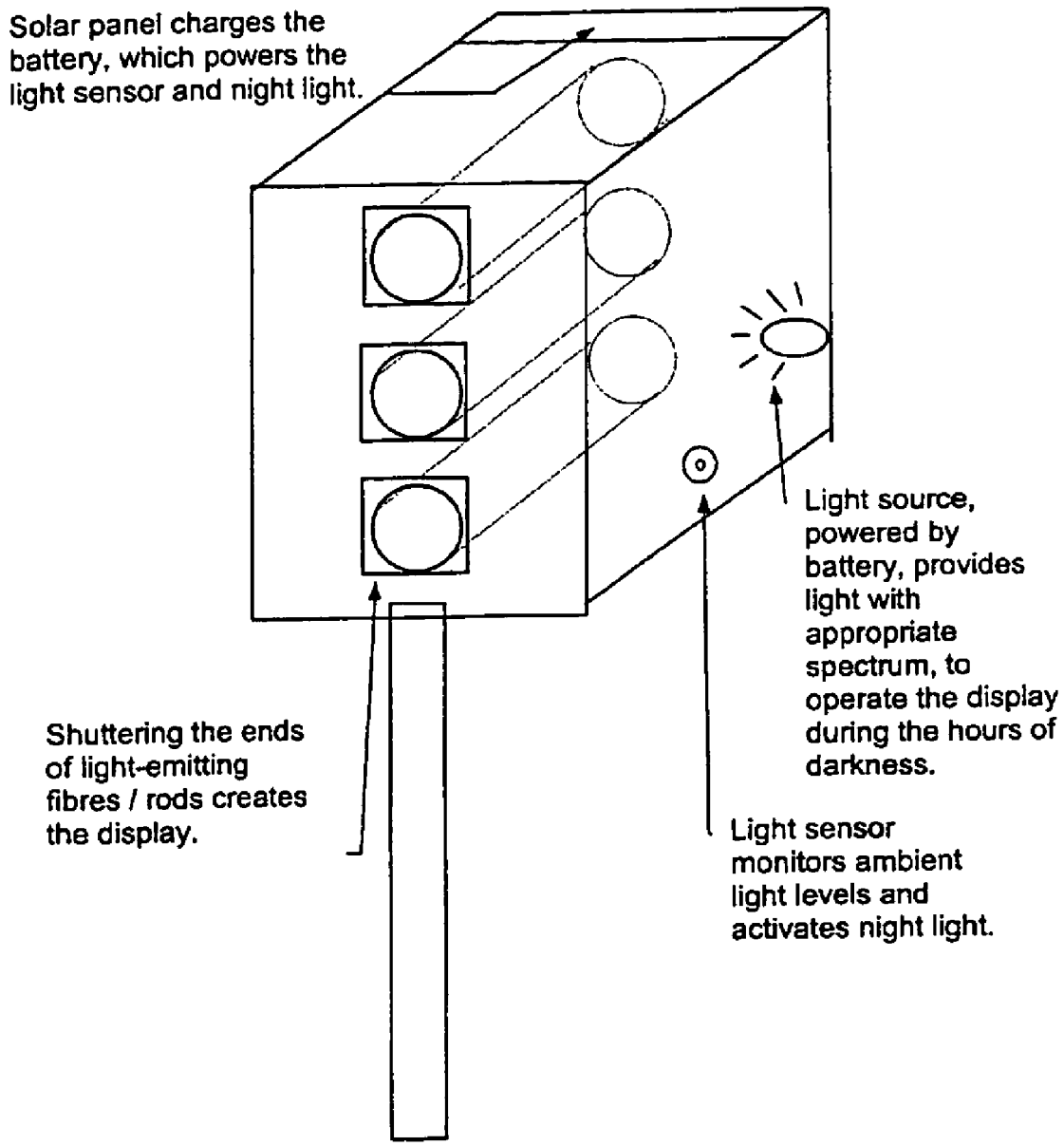
FIG. 25 shows a 24 hour traffic lights display.

Using the fibres' qualities of producing red, green and amber fluorescent colours, a system can be designed to simulate traffic lights, with the sequence control circuitry, light sensor and night light powered using the solar panel/battery combination (as detailed in the 24 hour road signs application). An example of such a device and the principles involved, is shown in FIG. 25.

Fixed Advertisements

These can take one of several primary forms, or combinations of these forms. The first form is that of fibres/rods, as used in the '24 hour road signs, but without using any shuttering process. i.e. they continuously display an unchanging image, whether that image is in the form of characters, symbols, logos, or in the style of a picture, or in some combination of these.

The lengths of fibres/rods would not be shown, only the artwork as would be seen from the front is displayed.

The second form is that of a contoured sheet format, where the edges of the sheet emit light and form the display, this can take the form of characters, shapes, logos.

Figure 26:
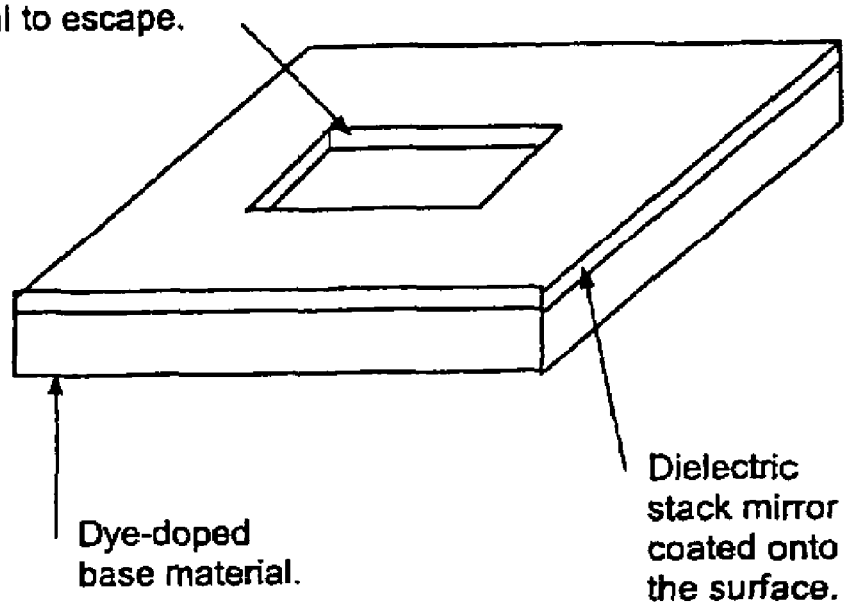
FIG. 26 shows a fixed advertisement display having a polymer sheet with a dielectric stack mirror coated on the surface.

The third format is that of a sheet which has a dielectric stack mirror coated onto the surface. An example of such a device and the principles involved, is shown in FIG. 26. The purpose of the coating is to allow sunlight to penetrate into the sheet material, and to energise the incorporated dye, but then to trap the fluorescent light produced within the sheet, by reflecting these fluorescent wavelengths back from the surface coating. By selectively removing parts of the coating, light is permitted to escape from the sheet, and this forms the basis of a display. In this way, characters, symbols, logos, diagrams etc. can be produced.

Operation of doped material during the hours of darkness can also be achieved using material which can absorb light from street lights (from the sodium D lines 589.0 and 589.6 nm) and convert it to red fluorescent light. Typical materials, along with their maximum excitation wavelength ($\lambda_{exc.max}$) and their maximum emission wavelength ($\lambda_{em.max}$) are:

| Material | $\lambda_{exc.max}$ | $\lambda_{em.max.}$ |
| --- | --- | --- |
| cresyl violate perchlorate | 593 | 615 |
| oxazine 4 perchlorate | 610 | 625 |
| sulforhodamine 101 | 578 | 605 |
| LD 690 perchlorate | 616 | 625 |

Toys

The integration of this technology into toys can take on several forms. Fibres can be transformed into flowers, where the long stem gathers the sunlight and the head/petals etc. emit the fluorescent light. Doll's hair and cat's whiskers can also use this approach.

Sheet format can be used to produce structures which are colourful and strong, yet virtually transparent, where its edges emit fluorescent light e.g. a doll's house, where the interior decoration/furniture can be viewed through the exterior walls, and the light is emitted from around the windows/door/roof edges etc. to give the impression of a 'magic' house.

Moulding of the material into different shapes can be done. These shapes may either be hollow or solid, and could produce a range of toys which are tough and durable, yet can incorporate special features, such as 'shining' eyes, ears, a laser gun which emits 'laser' light, or a number of other accessories for toys/movie theme characters.

Use can be made of the dielectric stack mirror onto these materials to produce numerous effects. e.g. a car track can be designed to reveal an effect similar to 'shining' cat's eyes; a toy garage can have its sign illuminated; lights illuminating the floor of a small swimming pool; windows which appear to have a light switched on inside the room of a toy house etc.

Games which utilise the capture of sunlight, with the subsequent emission of a range of visible colours can be designed.

Figure 27:
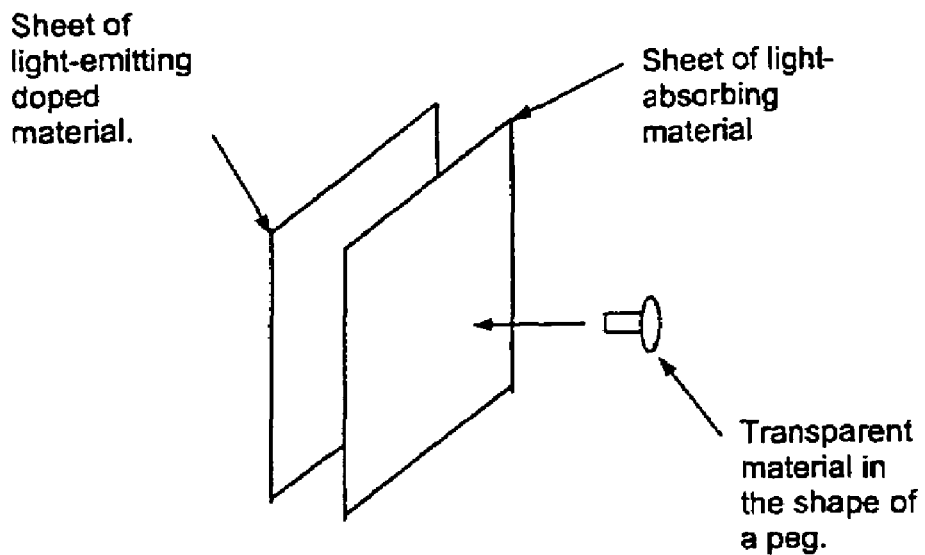
FIG. 27 shows a toy using a transparent peg.

As the peg is pushed through the sheet of light absorbing material, it comes into contact with the sheet of light-emitting material, and this allows the light to pass into the peg, which then becomes illuminated. An example of such a device and the principles involved is shown in FIG. 27.

Safety.

Fibres have a certain amount of light 'leaking' out along its length. This is dependant upon the refractive indices of both the doped material and the substance in contact with this material, and also on the amount the material is bent. From these facts, there are three techniques which can be applied to improve peoples' safety in dark conditions or when poor visibility exists.

Figure 28:
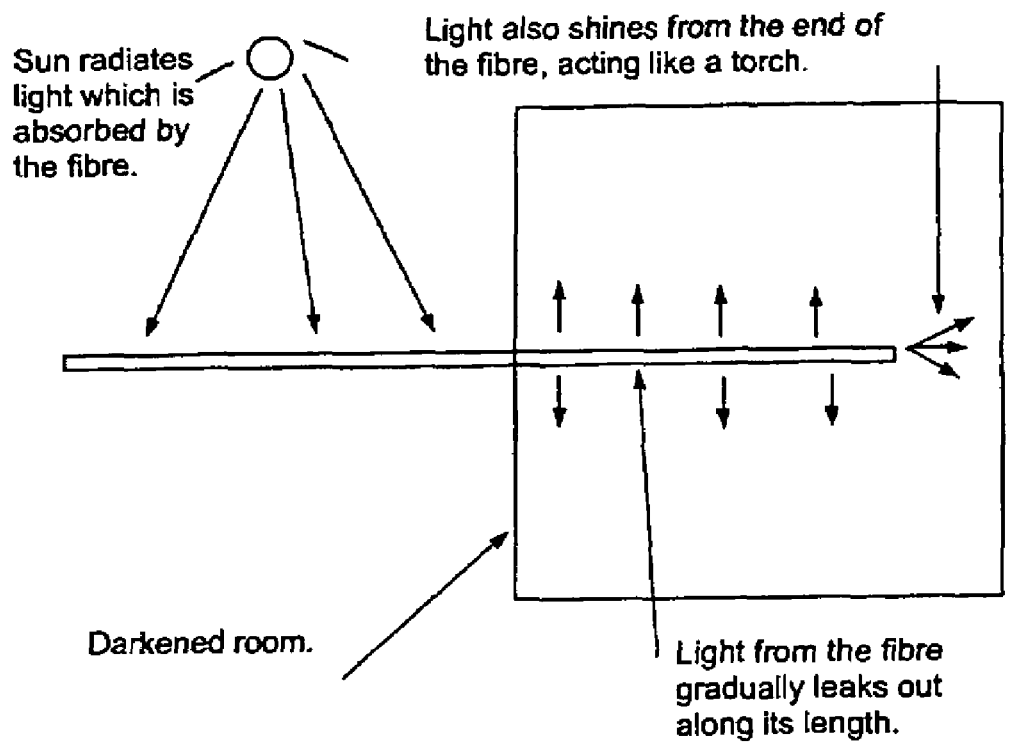
FIG. 28 shows a safety display.

By capturing sufficient sunlight into a section of the fibre which is exposed to the sun, then light will leak out gradually along that part of its length which is placed within the darkened conditions. In this way, anyone can follow the illuminated fibre out of the darkened room to safety. An example of such a device and the principles involved, is shown in FIG. 28.

The second and third techniques involve the same principles of injecting light into the fibre as the one just described. However, the second technique makes use of the fact that a bend in the fibre will cause an increased amount of light to leak out. This may be useful where an increased amount of light is necessary in order to be seen (e.g. in smoke-filled rooms). Also, the spacings between the bends can be utilised to inform the people which is the quickest way out of the room (e.g. decreasing spaces indicates the way out).

The third technique makes use of the substance in contact with the doped material. If a substance which has a refractive index similar to the doped material is placed in contact with it, then an increased quantity of light will leak out. This can both be used to make that area more easily visible and also to provide information. (e.g. the geometrical shape of the substance (e.g. →) can be selected to guide the person from the room in the easiest manner.)

Two other methods of capturing light from outside a building and introducing it into the inside are by using a sheet on the outside to collect the light and by attaching fibres to the edges of the sheet, the light is coupled to the fibres, which can then be fed into the inside of the building. The other method of transferring light to the inside of a building is by using a longer length(s) of fibre/rod on the outside and passing the fibre into the interior.

Another safety application could be as sails, or sail coating, so that the edge of the sail becomes more easily visible in misty, foggy conditions, or when the light level is poor.

People who go out jogging in poor conditions could also benefit from wearing an outer garment which is made from, or has patches of, this material. Jogging shoes could also benefit in a similar way. They would be more easily seen by motorists, and so help to avoid accidents.

Cars, motorcycles and cyclists can also benefit from fitting sections of this fluorescent material onto their external surfaces, so that other motorists/pedestrians can see them more easily. This can take the form of a warning strip which can be seen on e.g. all four sides of a car.

Airport Runway Illumination

Figure 29:
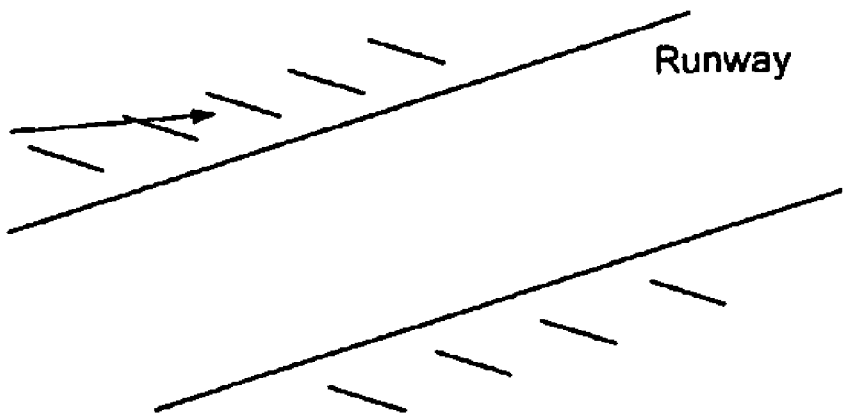
FIG. 29 shows an airport runway illumination display.

An application of light-emitting fibres/rods is that of airport runway lights, where a series of these rods are placed on either side of the runway, and each rod is suitably angled towards the incoming aircraft. An example of such a device and the principles involved, is shown in FIG. 29.

This application would be for daytime use, and the existing system of runway lighting would be used during the hours of darkness.

Fashion Accessories

A range of accessories can be designed to take advantages of the materials' light-emitting qualities. These include raincoats with edges that shine, clothes or cloth, patches, broches, rings, jewellery, necklaces, bangles etc.

Other types of concepts include candles with a light-emitting 'flame' and Christmas tree lights.

24 Hour Bus Arrival Scheduler

Figure 30:
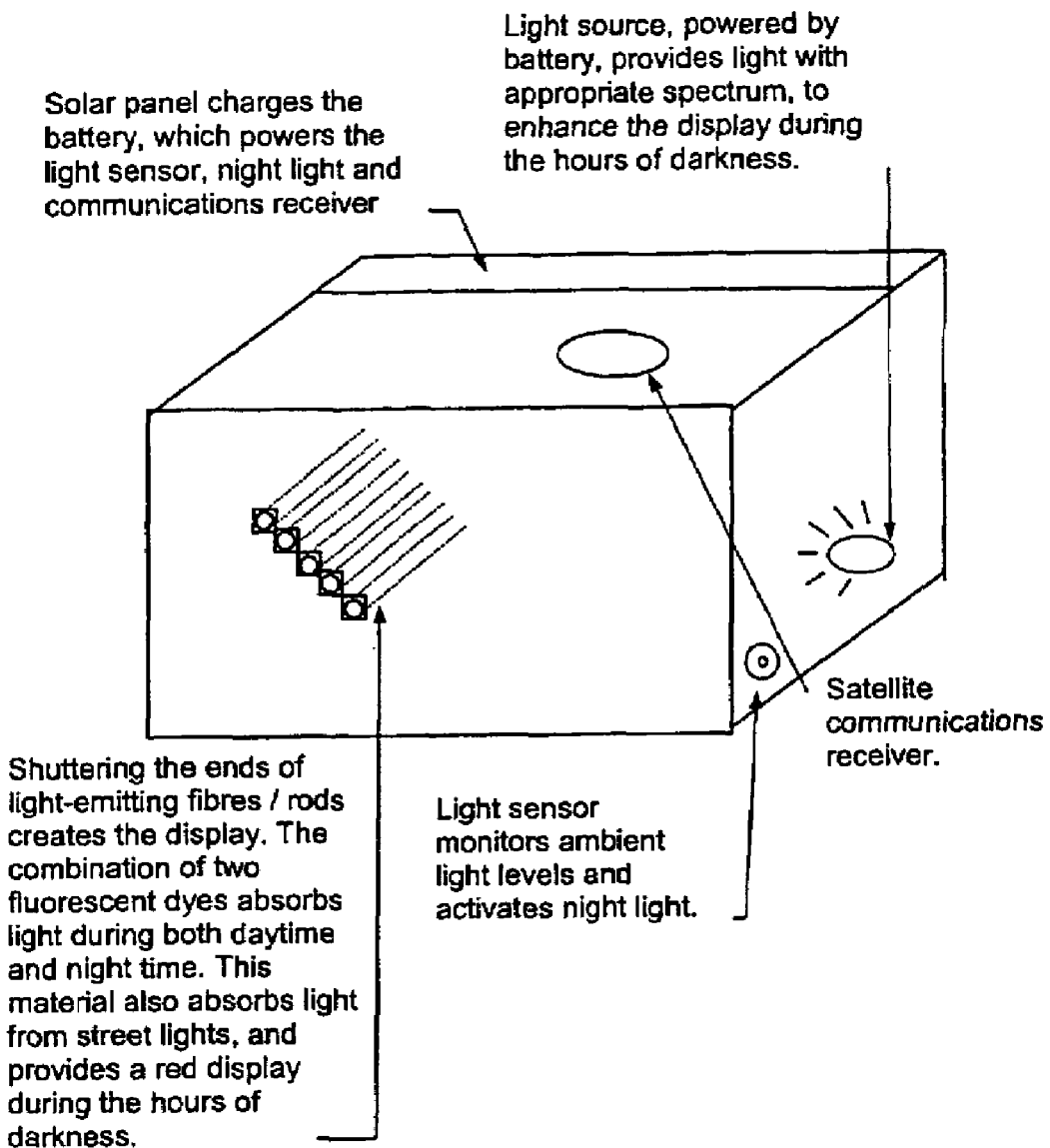
FIG. 30 shows a 24 hour bus arrival schedule display.

This is a communication device, mounted at a bus stop, which informs potential passengers when the arrival of the next bus(es) is due. It takes the form of a satellite communications receiver/decoder, linked up to a display which consists of a doped material which can operate even during the hours of darkness. This can be achieved using material which can absorb light from street lights (from the sodium D lines 589.0 and 589.6 nm) and convert it to red fluorescent light. A solar panel can be used to charge a battery which provides power for the communications receiver and the electronically-controlled shuttering for the display. A back-up night light can be provided to enhance the visibility of the display in conditions where the street lights are poor. This would also be powered by the battery. An example of such a device and the principles involved is shown in FIG. 30.

The invention claimed is:

1. A display comprising a plurality of optical fibres, each optical fibre comprising an optically transparent polymer doped with a mixture of fluorescent dye molecules comprising Coumarin 6 and Nile Red, which fibre is dimensioned such that, when said fibre is exposed to ambient light conditions sufficient for the excitation of the dye molecules, fluorescent light is emitted wherein there is a constant contrast between the light power flux emitted from the optical fibre and the light power flux from the ambient light and wherein the ratio between the light power density at the end of the fibre and the light power density of the ambient light is greater than 10:1, and wherein the display further comprises shutters to selectively modulate the light intensity at the end of each optical fibre.

2. A display according to claim 1 wherein the polymer is further doped or blended with organic fluorescent dye molecules chosen from a group comprising PBD, Bis MSB, 3-3'-diethyloxycarbocyanine-iodide, cresyl violet 670 perchlorate, Coumarin 7, Coumarin 314, 1,8-Diphenyl-1,3,5,7-octatetrene, Sulforhodamine 101, Sulforhodamine 640.

3. A display as claimed in claim 1 wherein the polymer is doped with 3 dyes.

4. A display as claimed in claim 1 wherein the polymer is doped dyed with Nile Red 0.04% and Coumarin 6.

5. A display as claimed in claim 4 wherein the polymer is doped with Nile Red 0.04%, Coumarin 6 and Bis MSB.

6. A display as claimed in claim 1 which has a radius of between 0.25 and $0.70 \times 10^{-2}$ metres and a length of between 0.2 and 1.6 meters.

7. A display as claimed in claim 1 wherein the polymer is chosen from the group comprising PMMA, polycarbonate and polystyrene.

8. A display as claimed in claim 1 wherein each optical fibre is covered with a dielectric stack mirror, said stack acting as an interference filter to allow transmission of ambient light into the optical fibre and which reflects light emitted from the fluorescent dye molecules within the optical fibre.

9. A display as claimed in claim 8 wherein the dielectric stack mirror is comprised of thin films of two different polymers which have different refractive indices.

\* \* \* \* \*